(12) United States Patent
Moreno

(10) Patent No.: US 10,479,465 B2
(45) Date of Patent: Nov. 19, 2019

(54) UNDERWATER MODULAR DEVICE

(71) Applicant: O-ROBOTIX LLC, Las Vegas, NV (US)

(72) Inventor: Eduardo Moreno, Yuma, AZ (US)

(*) Notice: Subject to any disclaimer, the term of this patent is extended or adjusted under 35 U.S.C. 154(b) by 129 days.

(21) Appl. No.: 15/129,392

(22) PCT Filed: Mar. 25, 2015

(86) PCT No.: PCT/US2015/022577
§ 371 (c)(1),
(2) Date: Sep. 26, 2016

(87) PCT Pub. No.: WO2015/148729
PCT Pub. Date: Oct. 1, 2015

(65) Prior Publication Data
US 2017/0174300 A1    Jun. 22, 2017

Related U.S. Application Data

(60) Provisional application No. 61/970,113, filed on Mar. 25, 2014, provisional application No. 61/974,967, (Continued)

(51) Int. Cl.
| | |
|---|---|
| *B63G 8/00* | (2006.01) |
| *B63G 8/14* | (2006.01) |
| *B63G 8/16* | (2006.01) |
| *B25J 9/08* | (2006.01) |
| *B63G 8/08* | (2006.01) |

(Continued)

(52) U.S. Cl.
CPC .............. *B63G 8/001* (2013.01); *B25J 9/08* (2013.01); *B63G 8/04* (2013.01); *B63G 8/08* (2013.01); *B63G 8/16* (2013.01); *B63G 8/22* (2013.01); *G05D 1/0875* (2013.01); *B63B 2201/02* (2013.01); *B63B 2207/02* (2013.01);
(Continued)

(58) Field of Classification Search
None
See application file for complete search history.

(56) References Cited

U.S. PATENT DOCUMENTS

| | | |
|---|---|---|
| 5,523,662 A | 6/1996 | Goldenberg et al. |
| 5,672,924 A | 9/1997 | Wallace et al. |

(Continued)

FOREIGN PATENT DOCUMENTS

WO   WO-2013157977 A1   10/2013

OTHER PUBLICATIONS

International Search Report dated Aug. 20, 2015 for International Application No. PCT/US2015/022577.
(Continued)

*Primary Examiner* — John Olszewski
*Assistant Examiner* — Gerrad A Foster
(74) *Attorney, Agent, or Firm* — Morris, Manning & Martin, LLP; Adam J. Thompson

(57) ABSTRACT

Reconfigurable vehicles, methods of configuring modular vehicles are provided. Vehicles may have modules that may be coupled to the vehicle at discrete positions and at discrete angles. Configurations for the modular vehicles may be further determined automatically depending on desired vehicle characteristics. Modular vehicles may be configured manually, and a predicted vehicle characteristic may be determined.

18 Claims, 36 Drawing Sheets

Related U.S. Application Data filed on Apr. 3, 2014, provisional application No. 62/075,010, filed on Nov. 4, 2014, provisional application No. 62/114,985, filed on Feb. 11, 2015.

(51) Int. Cl.
  B63G 8/04 (2006.01)
  B63G 8/22 (2006.01)
  G05D 1/08 (2006.01)

(52) U.S. Cl.
  CPC .... *B63B 2755/00* (2013.01); *B63G 2008/004* (2013.01); *B63G 2008/005* (2013.01)

(56) References Cited

U.S. PATENT DOCUMENTS

| | | | |
|---|---|---|---|
| 6,084,373 A | 7/2000 | Goldenberg et al. | |
| 6,323,615 B1 | 11/2001 | Khairallah | |
| 6,605,914 B2 | 8/2003 | Yim et al. | |
| 7,219,613 B2 | 5/2007 | Root, Jr. et al. | |
| 7,278,364 B2 | 10/2007 | Root, Jr. et al. | |
| 8,082,870 B2 | 12/2011 | Shen | |
| 8,106,616 B1 | 1/2012 | Theobald | |
| 8,490,569 B2 | 7/2013 | Shen | |
| 8,539,898 B1 | 9/2013 | Sylvia et al. | |
| 8,677,920 B1 | 3/2014 | Jeng | |
| 2007/0276552 A1 | 11/2007 | Rodocker et al. | |
| 2009/0260472 A1 | 10/2009 | Suga et al. | |
| 2010/0305778 A1 | 12/2010 | Dorneich et al. | |
| 2011/0061583 A1 | 3/2011 | Mackinnon | |
| 2012/0160509 A1* | 6/2012 | Caldwell | E21B 33/037 166/363 |
| 2012/0215348 A1 | 8/2012 | Skrinde | |
| 2012/0309241 A1 | 12/2012 | Yeo | |
| 2013/0263770 A1 | 10/2013 | Andersen | |
| 2014/0080367 A1 | 3/2014 | Gariepy et al. | |

OTHER PUBLICATIONS

Doniec, et al., Complete SE3 Underwater Robot Control with Arbitrary Thruster Configurations. Computer science and artificial intelligence laboratory. 2010.

Doniec, et al., Using Optical Communication for Remote Underwater Robot Operation. Computer science and artificial intelligence lab. 2010.

* cited by examiner

30a.

30b.

30c.

30d.

UNDERWATER MODULAR DEVICE

CROSS-REFERENCE

This application claims the benefit of U.S. Provisional Application No. 62/114,985, filed Feb. 11, 2015, U.S. Provisional Application No. 62/075,010, filed Nov. 4, 2014, U.S. Provisional Application No. 61/974,967, filed Apr. 3, 2014, and U.S. Provisional Application No. 61/970,113, filed Mar. 25, 2014 which applications are incorporated herein by reference.

BACKGROUND OF THE INVENTION

There exists a need for modular and/or configurable devices. For example, modularity or configurability may be a desired characteristic for vehicles such as submersible robotic devices (SRD), remotely operated vehicles (ROV) and autonomous underwater vehicles (AUV). A versatile vehicle, such as a Modular Underwater Device (MUD) may enable a flexible system that allows the MUD to be adapted to a variety of tasks. For example, a MUD may permit for dynamic optimization of thruster placement based on a task to be performed.

SUMMARY OF THE INVENTION

In some instances, it may be desirable to provide a MUD. Such a device may be adapted to perform a variety of tasks, such as exploration, image capture, manipulation of external environment, construction, and the like. The MUD may be configured to efficiently perform a variety of tasks. The MUD may have a variety of components that may be placed on a main body (e.g., main body frame). The placement of components, such as actuators, on the device may be optimized through programming algorithms.

Thus in one aspect, a reconfigurable vehicle provided. The reconfigurable vehicle comprises: a main body comprising a plurality of mounting positions at discrete locations; and one or more mounts, wherein the one or more mounts are capable of being coupled to the mounting positions at a plurality of discrete angles.

In some embodiments, the main body comprises an upper frame and a lower frame. In some embodiments, the upper frame is coupled to the lower frame via the one or more mounts, and wherein the one or more mounts comprise one or more joints. In some embodiments, the one or more column joints comprise a plurality of bores located along a longitudinal axis of the column joints, and wherein the plurality of bores allow one or more actuators to be coupled to the one or more column joints. In some embodiments, the one or more actuators comprise one or more joints. In some embodiments, the one or more joints allow the one or more actuators to rotate about the pitch, yaw, or roll axis. In some embodiments, the one or more actuators can be held at a predetermined position via constraining mechanism. In some embodiments, the constraining mechanism comprises bores and pins. In some embodiments, the one or more joints allow the one or more actuators to translate relative to the one or more joints. In some embodiments, the one or more actuators can be held at a predetermined position via constraining mechanism. In some embodiments, the constraining mechanism comprises bores and pins. In some embodiments, the column joints are detachable. In some embodiments, the upper frame is fixed relative to the lower frame. In some embodiments, the lower frame comprises a hollow inner portion, thereby allowing fluid flow therethrough. In some embodiments, the upper frame comprises a hollow inner portion. In some embodiments, the upper and lower frames are circular, thereby producing symmetric drag characteristics. In some embodiments, the upper and lower frames protrude radially further than the one or more mounts, thereby protecting the one or more mounts. In some embodiments, the one or more mounts comprise one or more actuators. In some embodiments, the one or more actuators comprise one or more thrusters including a motor and a propeller. In some embodiments, the motor is housed within the propeller. In some embodiments, each of the one or more actuators further comprise a shroud that protects the rotor and propeller. In some embodiments, the propeller is coupled to the shroud via single cantilevered support, thereby decreasing likelihood for jamming. In some embodiments, the main body comprises an upper frame and a lower frame. In some embodiments, the upper and lower frames protrude radially, thereby protecting the one or more actuators. In some embodiments, the one or more actuators are coupled to a current sensor and an rpm sensor. In some embodiments, the vehicle further comprises a top shell, wherein the top shell is coupled to an upper surface of the main body. In some embodiments, the top shell comprises an air pocket, thereby acting as a primary source of buoyancy. In some embodiments, the top shell is symmetrical about the z-axis, thereby producing symmetrical drag characteristics. In some embodiments, the top shell is symmetric about the x-y plane, thereby producing symmetrical drag characteristics. In some embodiments, top shell comprises a base and a cover, wherein the cover is capable of being coupled to the base, and wherein the base comprises electronics and a power source. In some embodiments, the cover is coupled to the base via press on mechanism. In some embodiments, the cover is coupled to the base via pivot locks. In some embodiments, the plurality of discrete angles are at 45 degree increments. In some embodiments, the vehicle is an underwater vehicle. In some embodiments, the one or more mounts comprise one or more modular weight mechanisms. In some embodiments, the modular weight mechanism is coupled to the lower frame via fasteners. In some embodiments, the modular weight mechanisms allow discrete amounts of weight to be added or removed, thereby shifting the center of mass of the vehicle. In some embodiments, the modular weight mechanisms allow discrete amounts of weight to be added or removed, thereby tuning a buoyancy of the vehicle. In some embodiments, the plurality of mounting positions is at least 10 mounting positions. In some embodiments, the one or more mounts are capable of being locked to the mounting positions at a plurality of discrete angles via hinge mechanism. In some embodiments, the one or more mounts are capable of being locked within the main body, thereby protecting the one or more mounts. In some embodiments, the hinge mechanism is a manual pin mechanism.

In another aspect, a method of automatically configuring a modular vehicle is provided. The method comprises: receiving, at a user terminal, user defined constraints, wherein the user defined constraints defines a desired vehicle characteristic; and determining, with aid of one or more processors, whether the desired vehicle characteristic is configurable.

In some embodiments, the method further comprises outputting one or more recommended configurations. In some embodiments, the one or more recommended configurations contain information regarding placement or type of structural components to couple with the modular vehicle. In some embodiments, the one or more recommended configurations are output on a display screen. In some embodiments, the recommended configurations are output on a graphical user interface. In some embodiments, the recommended configurations are output as a three-dimensional model of the modular vehicle containing one or more structural components of the one or more recommended configurations. In some embodiments, the one or more recommended configurations are sortable based on a predetermined preference. In some embodiments, the user terminal comprises a mobile device, computer, cell phone, PDA, tablet, or the modular vehicle. In some embodiments, the user defined constraints comprise at least one of payload parameters, vehicle degrees of freedom, velocities, force capabilities, moment capabilities, desired tool end-effector forces, water current conditions, and maximum number of actuators. In some embodiments, the modular vehicle is a submersible vehicle. In some embodiments, the method further comprises alerting the user of the vehicle performance. In some embodiments, the recommended configurations considers available components in a database.

In another aspect, a method of manually configuring a modular vehicle is provided. The method comprises: receiving, at a user terminal, a user configuration of the modular vehicle; and evaluating, with aid of one or more process, vehicle characteristics of the user configured modular vehicle.

In some embodiments, the user configuration comprises a three-dimensional model of the modular vehicle with desired structural components placed at desired locations on the modular vehicle by the user. In some embodiments, the three-dimensional model further displays configured vehicle characteristics. In some embodiments, the configured vehicle characteristics include the vehicle's force and moment capabilities. In some embodiments, the force and moment capabilities are shown in a three-dimensional graphical mesh representation. In some embodiments, the configured vehicle characteristics include the center of mass of the vehicle. In some embodiments, the configured vehicle characteristics include a buoyancy of the vehicle. In some embodiments, the configured vehicle characteristics include a location of the center of drag of the vehicle. In some embodiments, the user configuration is selected from a list of predetermined list of configurations. In some embodiments, the method further comprises alerting the user of the vehicle performance. In some embodiments, the method further comprises alerting the user of vehicle constraint violations. In some embodiments, the vehicle is a submersible vehicle.

In another aspect, a method for waterproofing a brushless motor is provided. The method comprises: applying coating to a motor stator; curing the coating of the motor stator; winding the stator with plastic coated copper wire; and sealing ends of the copper wire with waterproof epoxy.

In some embodiments, applying coating comprises applying electrostatic power coating.

In another aspect, a method for untangling an actuator is provided. The method comprises: determining a current drawn by the actuator; determining an RPM of the actuator; and operating the actuator in a reverse direction if the current draw is greater than a predetermined threshold and the RPM is greater than 0.

In some embodiments, the method further comprises operating the actuator in a second reverse direction. In some embodiments, the actuator is run in the reverse direction for a predetermined period of time.

In another aspect, a system for configuring a vehicle is provided. The system comprises: a configurable vehicle, wherein the vehicle comprises: a main body comprising a plurality of mounting positions at discrete locations; one or more mounts, wherein the one or more mounts are capable of being coupled to the mounting positions at a plurality of discrete angles; and one or more processors, wherein the one or more processors are configured to: receive user defined constraints, wherein the user defined constraints defines a desired vehicle characteristic; and determine whether the desired vehicle characteristic is configurable.

In another aspect, a system for configuring a vehicle, wherein the system comprises: a configurable vehicle, wherein the vehicle comprises: a main body comprising a plurality of mounting positions at discrete locations; one or more mounts, wherein the one or more mounts are capable of being coupled to the mounting positions at a plurality of discrete angles; and one or more processors, wherein the one or more processors are configured to: receive a user configuration of the vehicle; and evaluate vehicle characteristics of the user configured vehicle.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

A versatile vehicle, such as a configurable or modular vehicle, may enable a flexible system that allows the vehicle to be adapted to a variety of tasks. A user (e.g., vehicle operator) may modify a configurable vehicle depending on the user's needs. A configurable vehicle may enable optimization of components (e.g., number and type of components).

The number of components may be optimized. In some instances, an optimal number of components may be the minimal number of components necessary for a given task or application. Minimization of the number of components may minimize power consumption. For example, for a given task, a smaller number of components may reduce the necessary energy needed (e.g., the MUD may carry less weight and use less energy). For example, a vehicle may be configured with a minimum number of actuators necessary for a given mission and realize a more efficient use of energy. Optimizing the number of components on the vehicle may have additional benefits. For example, the size and scale of the vehicle may be reduced, resulting in compactness and increased portability.

The type of components may be optimized. A configurable vehicle may enable specific controllability of particular components of the vehicle. For example, one component may be modified to achieve a particular result (e.g., increase output of actuators). For a given task, the best components may be selected and unnecessary components may be replaced by components that may be beneficial. For example, certain sensors may be beneficial for differing tasks (e.g., pressure sensor vs. ultrasonic).

A reconfigurable vehicle may present other benefits. For example, a user may experience costs savings by being able to modify the MUD to be suited for a variety of applications and/or tasks and make it unnecessary to have different vehicles suited for different needs. For example, a reconfigurable vehicle's individual components may be switched out as future advances and technological advancements take place such that the reconfigurable vehicle would not be easily outdated. For example, a MUD may allow for the design of specific vehicle performance, by controlling for force output and available degrees of freedom. A large amount of correlated information may be required to design a SRD and therefore the time to design a vehicle may be of large amount. An MUD with a deterministic amount of reconfigurable actuators may enable easier determination of an optimization function. Knowledge of the optimization function may aid in determining a best MUD design for the given task and MUD constraints saving significant design time and costs. While underwater vehicles are primarily described herein, it shall be understood the vehicles and methods of the present application shall apply to any vehicle, including aerial vehicles and vehicles utilized in space (e.g., in a vacuum or in weak gravity).

Figure 1:
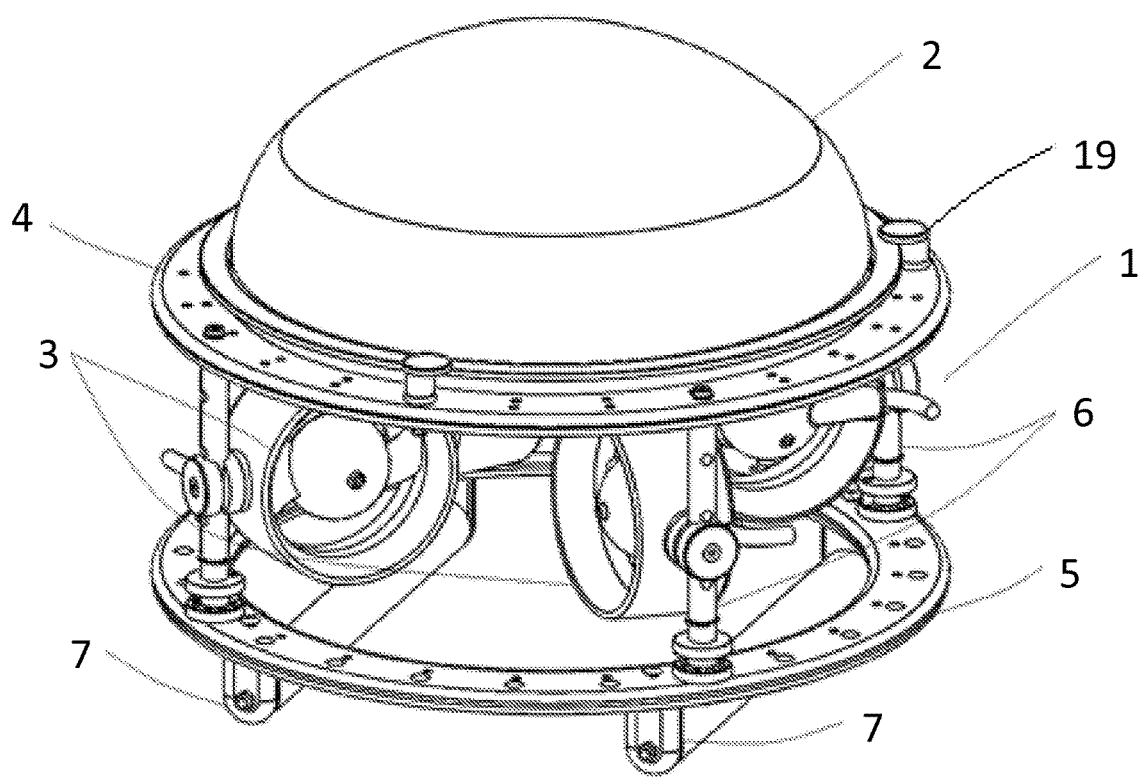
FIG. 1 provides a perspective view of a MUD with a specific actuator configuration, in accordance with embodiments.
Figure 2:
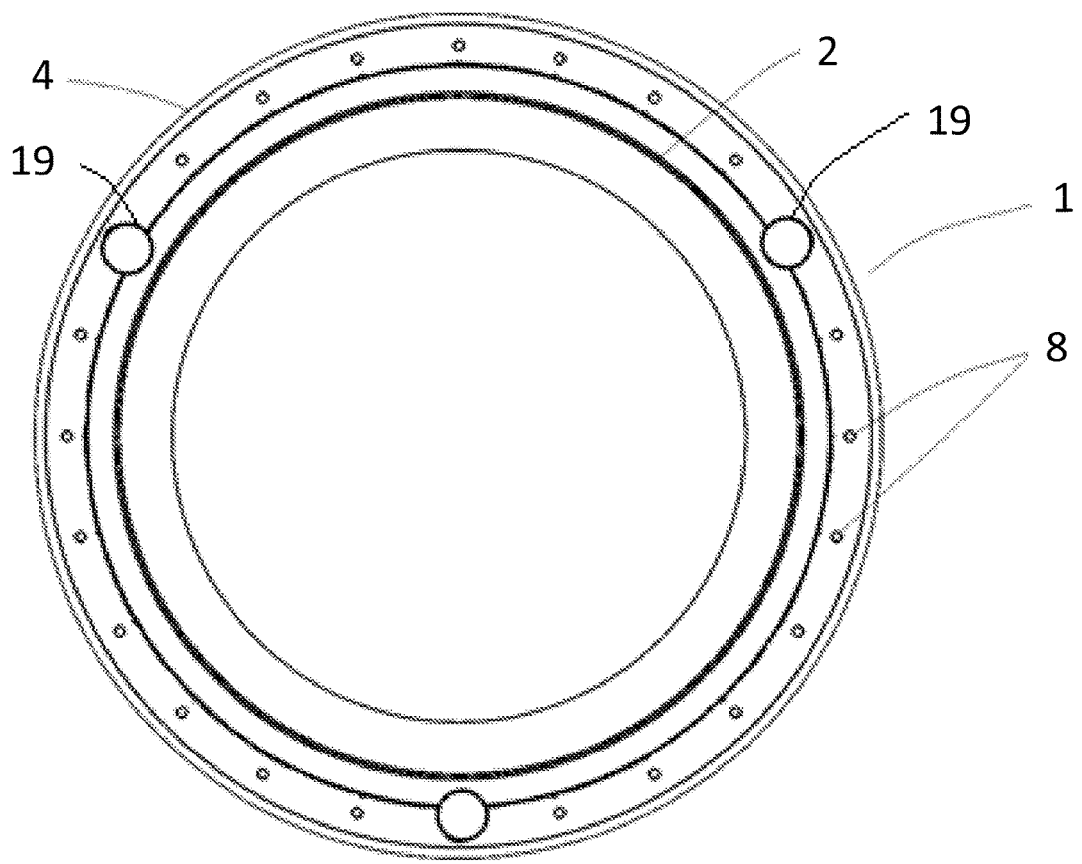
FIG. 2 provides a top view of a MUD with no actuators, in accordance with embodiments.
Figure 3:
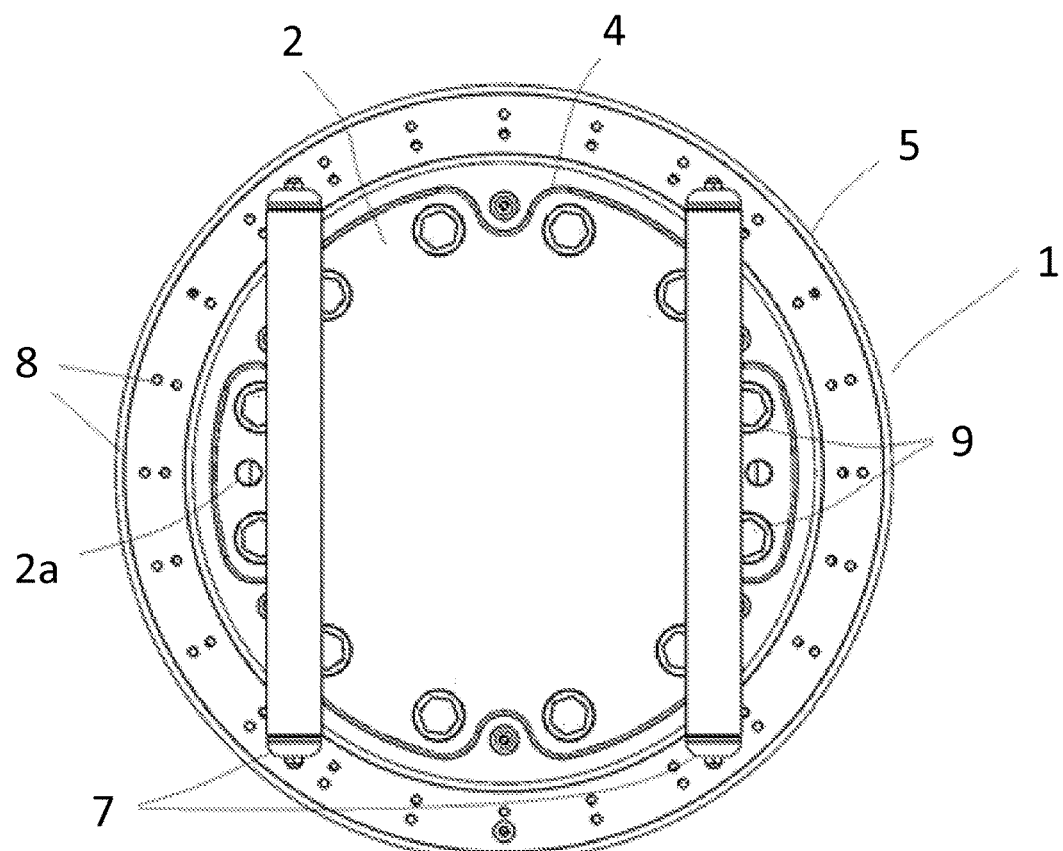
FIG. 3 provides a bottom view of a MUD with no actuators, in accordance with embodiments.

FIG. 1 provides a perspective view of a MUD 1 with a specific actuator configuration, in accordance with embodiments. The MUD may comprise a main body. Main body as used herein may refer to a main frame of a vehicle. A main body of MUD 1 may refer to a top plate 4 and bottom plate 5. The MUD 1 may comprise an electronic water-tight compartment 2, a plurality of modules (e.g., actuators) 3, a top plate 4, bottom plate 5, one or more column joints (e.g., modular column joints) 6 and one or more weight mechanisms 7. FIG. 2 provides a top view of the MUD 1, in accordance with embodiments. Top plate 4 (also referred herein as top frame or an upper frame), may hold and help protect the water-tight compartment 2 from impacts along its perimeter. A water-tight compartment, referred to herein as a top shell, may comprise a base and a cover. The cover and the base together may comprise a water tight compartment. For example, the base may be coupled to the cover via push on mechanism or snap on mechanism and prevent water from reaching inside of the top shell. The top shell may comprise an air pocket, thereby acting as a primary source of buoyancy. The top shell may be coupled to the top plate of the main body. The base may comprise electronics and/or power sources. The cover may be of a translucent or semi-translucent material. For example, the cover may be made of glass, silicon, plastic, acrylic, polycarbote, PETG, and the like. The top frame may protrude radially further than the water-tight compartment and protect the water-tight compartment from foreign objects. The top plate 4 may have one or more mounting positions 8. The mounting positions (also referred to herein as fixing mechanisms) may locate and help secure modules. As used herein, modules may refer to actuators, thrusters, column joints, modular column joints, payloads (e.g., cameras, ultrasonic sensors, etc), modular weight mechanism, weight mechanism, water-tight compartment, power source, battery, floats, manipulators, grippers, lights, probe, end-effector, and the like. For example, the mounting positions may locate and help secure modular column joints 6 along its perimeter. FIG. 3 provides a bottom view of the MUD 1 without actuators, in accordance with embodiments. The bottom plate 5, referred to herein as bottom frame or lower frame, may have one or more mounting positions. The mounting positions may locate and help secure modules, as described herein. For example, the mounting positions may locate and help secure the modular column joints 6 along its perimeter. The mounting positions for the top plate and bottom plate may be aligned. The mounting positions for the top plate and bottom plate may not be aligned.

Figure 4:
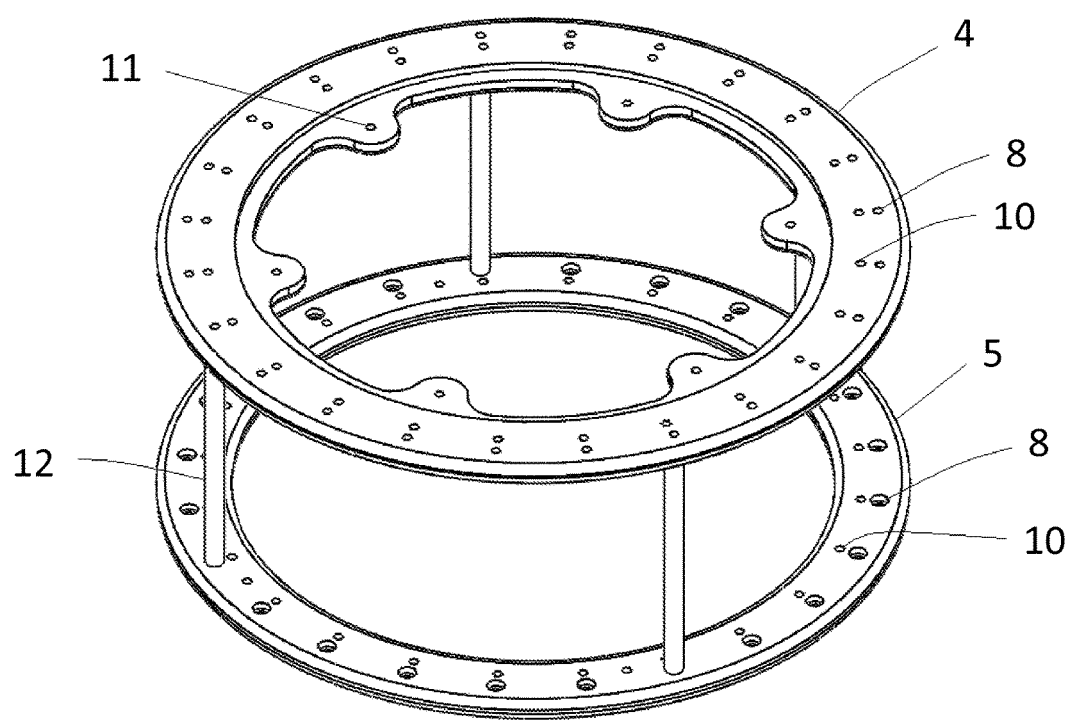
FIG. 4 provides a perspective view of the frame of a MUD, in accordance with embodiments.

FIG. 4 provides a perspective view of the frame of the a MUD, in accordance with embodiments. The frame of the MUD may refer to a main body of the MUD. The main body may comprise a top plate and a bottom plate. The top plate may be coupled to the bottom plate via structural columns 12. The structural columns may not be detachable. For example, the structural columns may be welded to the top and bottom plates. The structural columns may be detachable. For example, the structural columns may be held between the top plate and bottom plate by the fixing mechanisms (i.e., mounting positions) found on the top plate and bottom plate. In some instances, modular column joints may replace structural columns. Modular column joints as used herein may refer to columns with mounting positions, such as bores. Modular column joints may be coupled to modules, as described herein. For example, modular column joints may be coupled to one or more actuators 3 or another device needs to be secured to a column for example: other type of actuators besides thrusters (actuated rudder, servo motor, bio-inspired tail, wing, fin etc.), sensors, lights, modular column joints, payloads (e.g., cameras, ultrasonic sensors, etc), modular weight mechanism, weight mechanism, water-tight compartment, power source, battery, floats, manipulators, grippers, probe, and end-effectors. The top plate and bottom plate may have fixing mechanisms to secure a water-tight compartment 2 to the top plate 4. The bottom plate may have a hollow inner portion that allows fluid flow therethrough. The top plate may have a hollow inner portion. The bottom plate may have a cutout in the center to allow water flow through the structure. Both the top plate and bottom plate may act as bumpers to protect anything (e.g., modules) placed inside the volume created by both plates.

Figure 5:
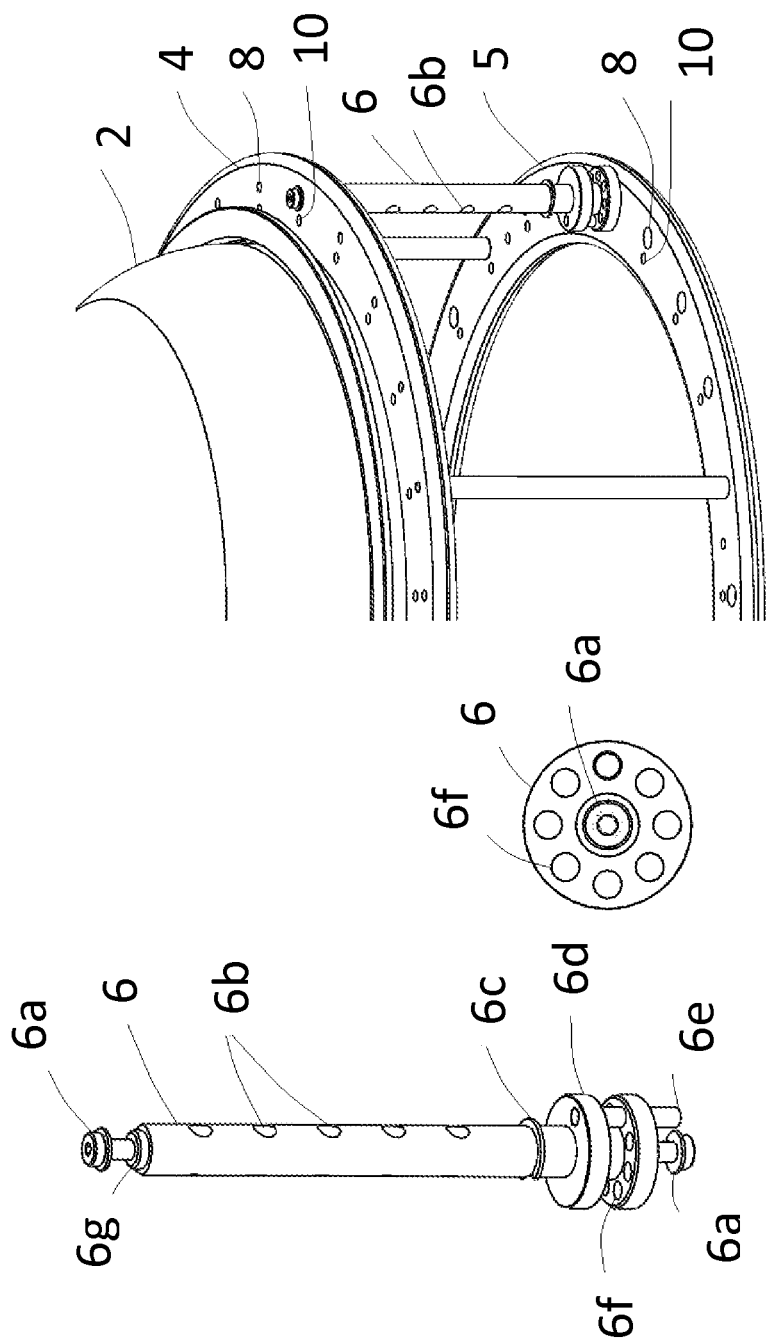
FIG. 5 provides a modular column joint (Left) and a bottom view of the column locking mechanism (Center) and a perspective view of a MUD showing a close up of the modular column joint, in accordance with embodiments.
Figure 6:
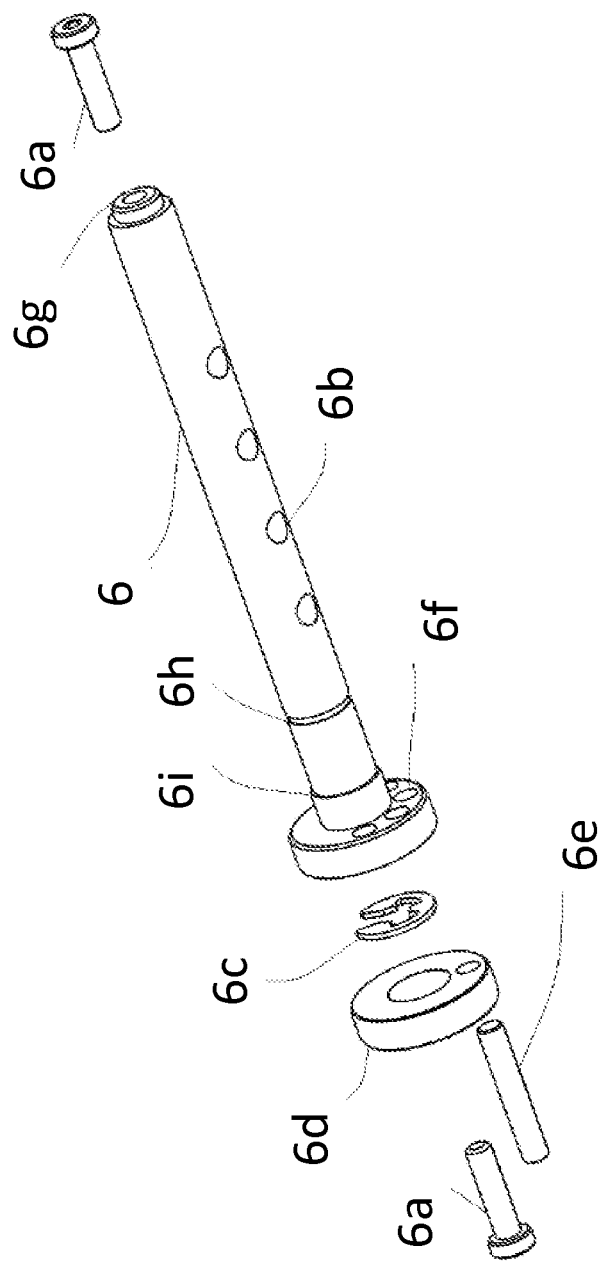
FIG. 6 provides a perspective and exploded view of a modular column joint, in accordance with embodiments.

FIG. 5 provides a modular column joint (Left) and a bottom view of the column locking mechanism (Center) and a perspective view of a MUD showing a close up of the modular column joint, in accordance with embodiments. FIG. 6 provides a perspective and exploded view of a modular column joint, in accordance with embodiments. The modular column joint may be attached to top plate 4 and bottom plate 5 via the fixing mechanism 8 and may be secured in place by an attachment mechanism 6a. The modular column joint 6 may contain one or more mounting positions (e.g., bores) 6b that allow the modules (e.g., actuators) to be mounted at several locations along a longitudinal axis of the modular column joints. In consequence, the modules may be coupled to the MUD at several locations along the height of the MUD. A vehicle or a rigid body in spaced may be considered to have 6 available degrees-of-freedom (e.g., 3 axis of rotation and 3 axis of translation). The 3 axis of rotation may referred to as pitch, yaw, and roll and the 3 axis of translation may be referred to as surge, sway, and heave. An under-actuated vehicle may be a vehicle that does not have full control over the 6 available degrees of freedom. For example in a 3 degree-of-freedom, an underactuated vehicle may only turn on its actuators to produce forces in certain directions to achieve movements in roll, yaw, and heave. If the MUD is under-actuated, a mechanism to counter the forces produced on the MUD 1 and payload by the center of drag may be incorporated.

The mechanism to counter the forces when the MUD is underactuated may be achieved by moving the actuators 3 mounted horizontally (as shown in FIG. 1) along the height of the vehicle in order match the MUD 1 center of drag. The center of drag, sometimes referred to as the center of pressure, may be a point where the total sum of pressure points act on a body, causing a force to act through that point.

The modules as described herein may comprise angle locating bores that allow the modules to be rotated about its center axis and locked at specific angles. For example, the modules may be locked at specific angles using pins that may be inserted in the bores (e.g., locking holes). For example, the modular column joint 6 may comprise angle locating bores 6f that allow the modular column joint 6 to be rotated about its center axis and locked at a specific angle using a pin 6e that may be inserted in the locking holes 10 on the top plate 4 and bottom plate 5 and one of the angle locating bores 6f located on the base of the modular column joint 6. The specific angles may be in increments of about or greater than 10 degrees, 15 degrees, 20 degrees, 30 degrees, 45 degrees, 60 degrees, or 90 degrees. A plurality of pin bores 6f may be located on modules. For example, a plurality of pin bores may be located on the bottom side of the modular column joint 6 (example: 4, 8, 12, etc.).

Figure 7:
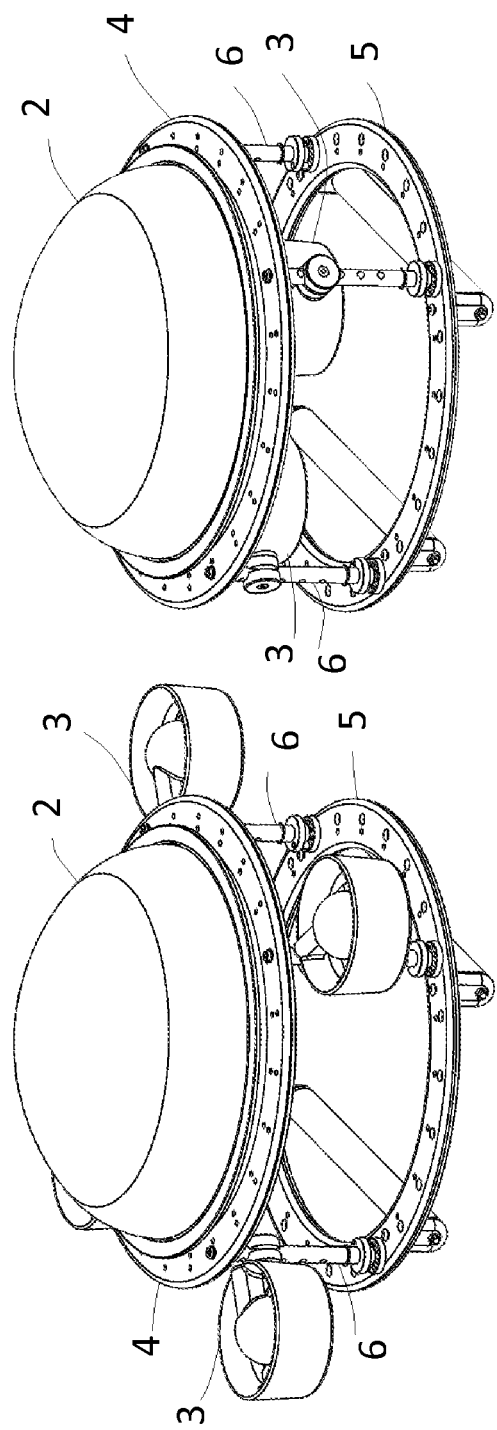
FIG. 7 provides a perspective view of the MUD with actuators outside of the MUD (Left); actuators inside the MUD (Right), in accordance with embodiments.
Figure 8:
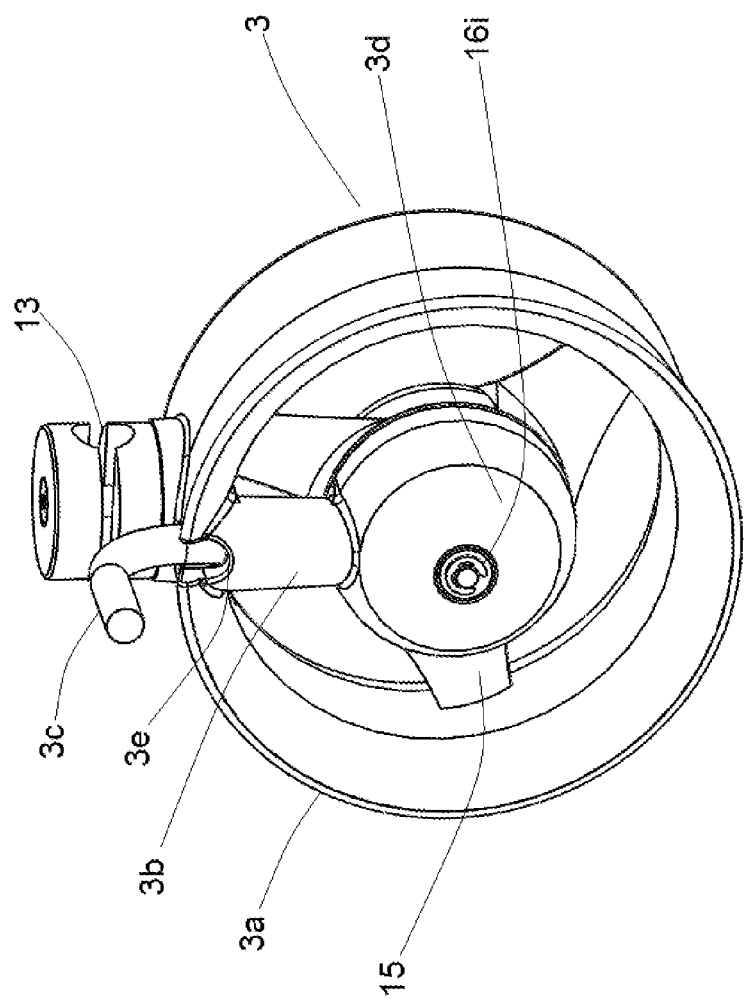
FIG. 8 provides an isometric view of the actuator, in accordance with embodiments.
Figure 9:
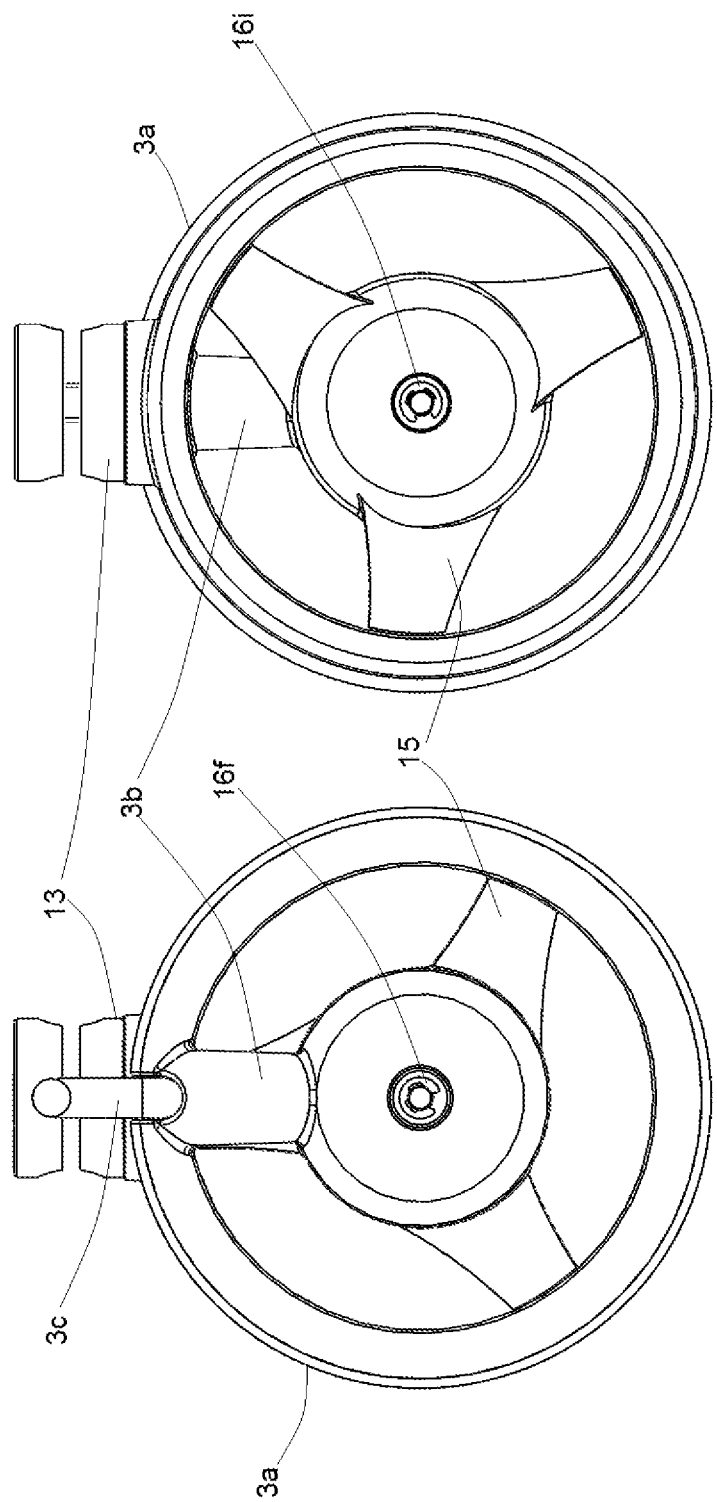
FIG. 9 provides a front of the actuator (Left) and the rear view of the actuator (Right), in accordance with embodiments.
Figure 10:
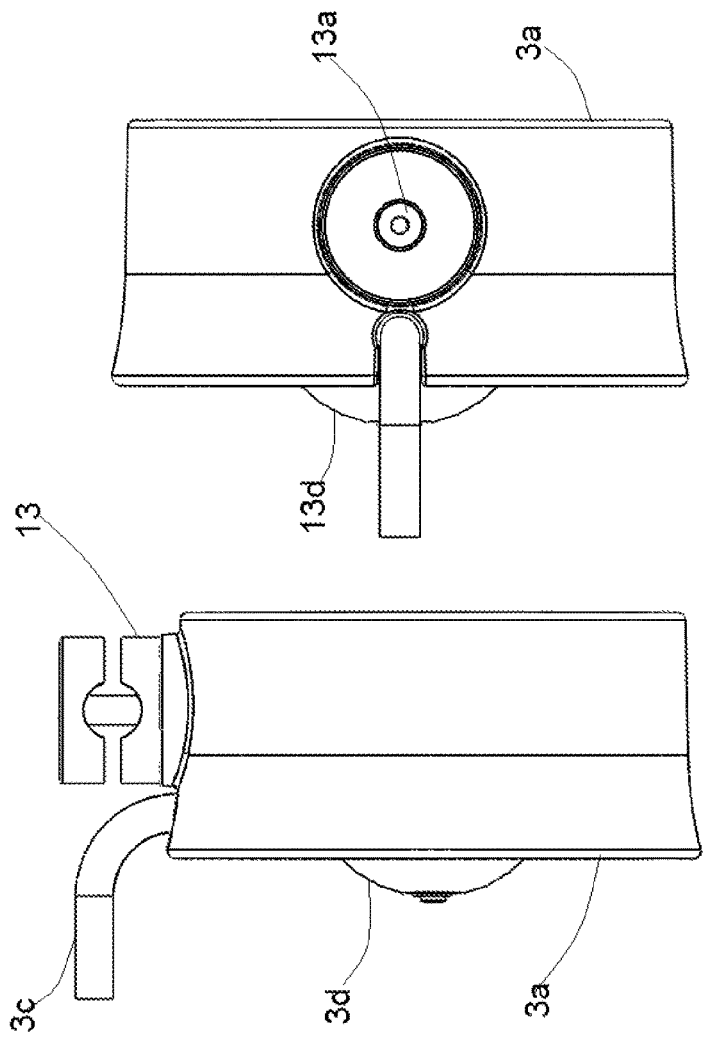
FIG. 10 provides a side view of the actuator (Left) and the top view of the actuator (Right), in accordance with embodiments.
Figure 11:
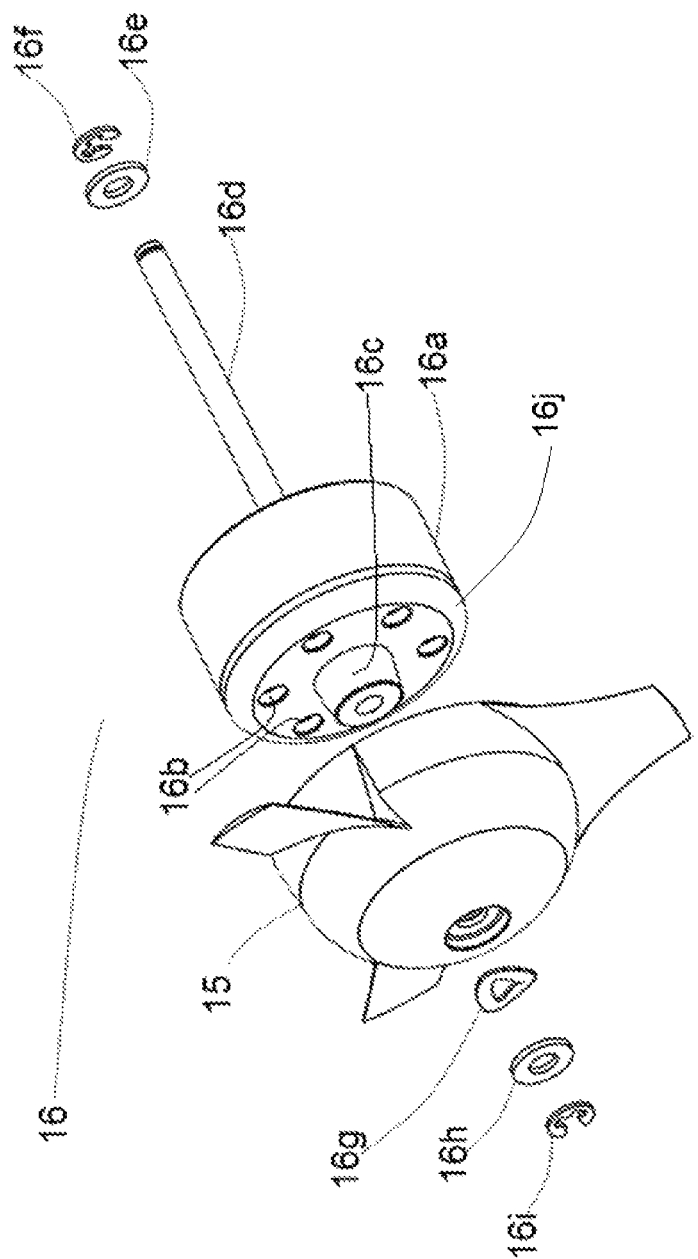
FIG. 11 provides a perspective and exploded view of the actuator rotor and propeller assembly, in accordance with embodiments.

FIG. 7 provides a perspective view of the MUD with actuators outside of the MUD (Left); actuators inside the MUD (Right), in accordance with embodiments. A version of the modular column joint may have a hinge mechanism that allows the modular column joint to quickly be rotated about its center axis. For example, in some instances, the hinge mechanism may allow a modular column joint to rotate about a location section 6g of the modular column joint 6 and about the fixing mechanism 8 of the top plate 4 and bottom plate 5. The function to quickly rotate the modular column joint 6 may allow users (e.g., MUD operators) to position modules (e.g., actuators) or other types of components outside of the structure of the MUD during operation and to position the actuators or other type of components inside the frame of the MUD 1 during storage/transport (e.g., as shown in FIG. 7) in order to protect the actuators 3 or other type of components from getting damaged and to make the MUD 1 more compact during storage.

In order to rotate the modular column joint 6, a Pin Mechanism may be incorporated. As part of the Pin Mechanism, a pin 6e may be retracted from the locking hole 10 on the top plate 4 or bottom plate 5. In order to insure that the pin 6e can be removed manually, a pin handle 6d may be attached to the pin 6e. When a user desires to rotate the modular column joint 6, the user may pull on the pin handle 6d in the direction of the groove 6h. When the modular column joint 6 is fully assembled (e.g., as illustrated in FIG. 5), the pin handle 6d may be concentric to the body of the modular column joint 6 and may be found between the column groove 6h and the stopper mechanism 6i. A retaining mechanism 6c may be installed at the same height as the column groove 6h to insure that when the pin 6e and pin handle 6d assembly are pulled, that the pull handle 6d will stop at the height of the retaining mechanism 6c when retracted from the locking holes 10 to insure that the desired modular column joint 6 angle can be quickly reproduced when the MUD 1 is transformed from storage mode to operation mode and vice versa (e.g., as shown in FIG. 7). The modular column joint 6 may have a stopper mechanism 6i that assures that the pin 6e is inserted to a particular depth into the locking holes 10.

Figure 16:
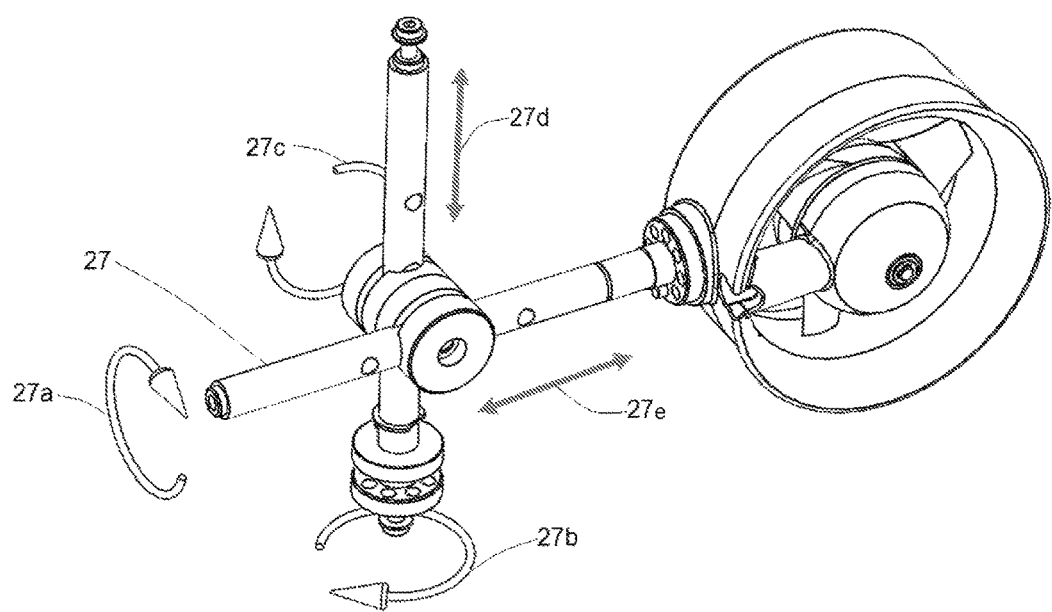
FIG. 16 provides a perspective view of joint assembly with two prismatic and 3 revolute axis of adjustment, in accordance with embodiments.

An actuator may be secured to the end of a modular column joint 6 or similar structure that allows the actuator 3 to be translated along the center of the modular joint 13 (e.g., as show by 27e in FIG. 16). The joint assembly 27, may conserve the ability to translate along the height of the column 27d and have both yaw and pitch rotations 27a and 27b. In joint assembly 27 another revolute joint may be available (e.g., 27c). In another embodiment, any or all the individual joints (27a, 27b, 27c, 27d, and 27e) in the joint assembly 27 in FIG. 16 may be actuated instead of passive.

Figure 13:
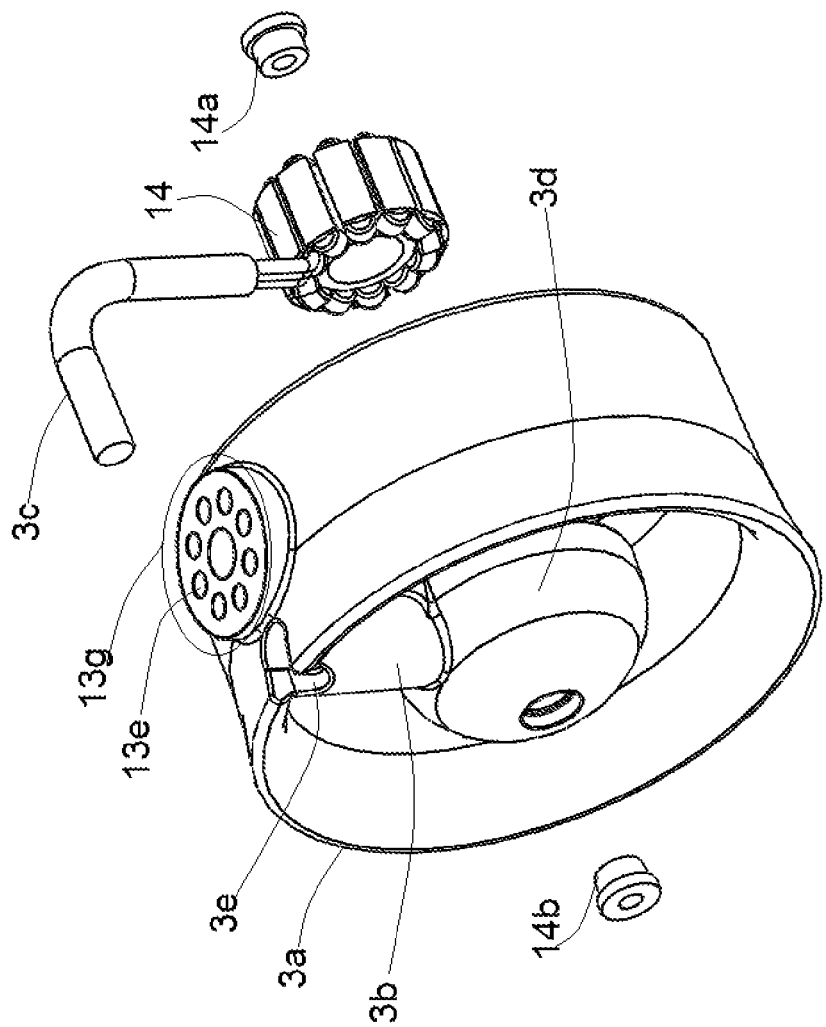
FIG. 13 provides a perspective and exploded view of actuator showing stator and bearings, in accordance with embodiments.

An actuator 3 can be secured to the top plate 4 or the bottom plate 5 at discrete angles. An actuator 3 mounted directly on the top plate 4 is shown in FIG. 13. Mounting to the top plate 4 or bottom plate 5 may be accomplished, for example, using a molded angle constraining mechanism 13g, fastener 13a, a metal insert 13d, a pin 17a, and a pin holder 17 shown in FIG. 14. The actuator's 3 molded angle constraining mechanism 13g may be pressed against the bottom of the top plate 4 as shown in FIG. 13 or can be pressed against the top side of the bottom plate using the faster 13a. The faster 13a may be inserted across a fixing mechanism 8 and secured to the metal insert 13d inside the shroud 3a. The pin 17a may be inserted across the locking hole 10 of the top plate 4 and into one of the molded bores 13e on the angle locking mechanism 13g. The desired angle between the actuator 3 and top plate 4 is depended on which molded bore 13e the pin 17a is inserted into. The actuator 3 can be fastened to the any available fixing mechanism 8 on the top plate 4 and bottom plate 5 using this method.

Figure 18:
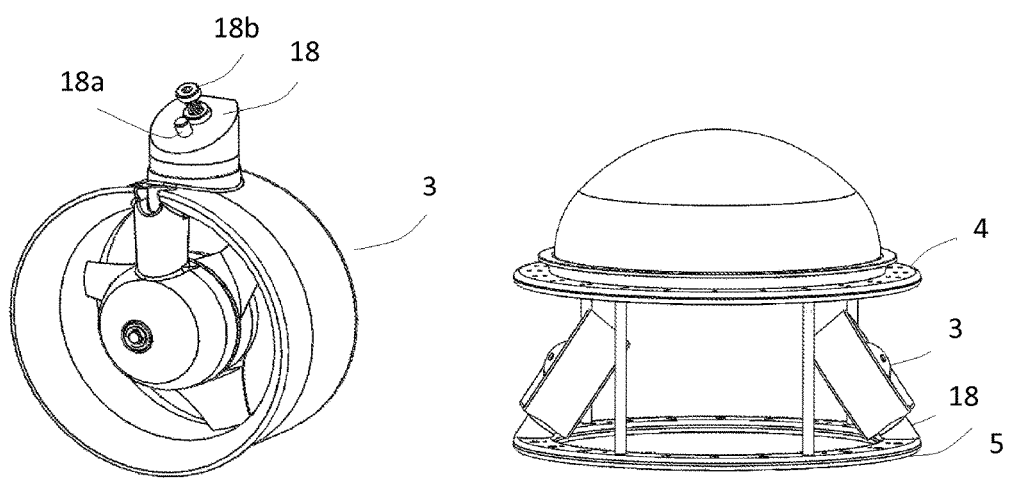
FIG. 18 provides a perspective view of actuator with angled mount (Left), front view of MUD with two actuators installed using the angled mount (Right), in accordance with embodiments.

An actuator 3 may be secured directly to the top plate 4 and bottom plate 5 using an angled mount 18 as shown in FIG. 18. A fastener 13a may thread the angled mount 18. The fastener 13a may be inserted through one of the fixing mechanisms 8 on the top plate 4 or bottom plate 5 and the pin 18a in inserted into a locking hole to fully constrain the actuator 3. The MUD 1 shown in FIG. 18 has two actuators 3 using the angled mount 18. This actuator configuration may allow the MUD 1 to move up and down without having an actuator 3 on the outside of the MUD 1 structure. By placing all actuators within the main frame, the size of the vehicle may be minimized. In some instances, mounting actuators using an angled mount 18 may be preferable, because the vehicle may gain an added degree of freedom. For example in the configuration shown in FIG. 18, with two angled actuators 3 the vehicle can translate vertically in the water (z-axis) and translate sideways (y-axis) as well as rotate about the x-axis. The modular joint 13, angled joint 18, joint assembly 27 can also be used to position other types of actuators (flippers, fins, pumps, etc.) and/or components (lights, cameras, grippers, etc.) on the MUD 1.

In order to allow non-experts to design a vehicle quickly, both hardware and software may be fused into a complete user experience. One embodiment of hardware was described as the vehicle with modules with discrete mounting positions and angles that allow placing modules at discrete mounting points on the main body, and at a plurality of discrete orientations (e.g., angles). Software is described elsewhere in the application (e.g., Automatic Configurator, Manual Configurator, Design Evaluation Tools, etc). Having a configurable vehicle with discrete mounting positions and angles that allow placing modules at discrete mounting points on the main body at discrete orientations (e.g., angles) may aid in a user (e.g., vehicle operator) experience. The discrete number of configurations may help produce a deterministic optimization algorithm as a particular input may always produce the same output. A vehicle that offers modules to be mounted at discrete positions and angles may act as constraints that help bound a function, and without them, the possible vehicle configurations may be infinite. A modular and reconfigurable vehicle wherein modules can be mounted at discrete positions and at a plurality of discrete orientations may allow the software as described herein (e.g., automatic configurator) to greatly simplify the ease of configuring vehicles for specific tasks and applications. Depending on the task, with the reconfigurable vehicle and the software as described herein, a user may utilize one vehicle to accomplish a variety of goals and tasks. A user may no longer need to purchase multiple vehicles if their mission (task) changes, and the user may reconfigure the vehicle for the new mission. The Auto Configurator, Manual Configurator, Design Evaluation tools, discussed may allow the user to have cost and vehicle performance predictions. These predictions may allow the user from making mistakes, wasting time manually tuning the real vehicle, and save valuable time designing the vehicle. The user may save a significant amount of time by not needing to manually input properties of modules provided in the database such as mass, COM, drag, COD, mounting point locations, Actuator (Force and frequency response curves)

The configurators (e.g., automatic and manual) may keep track of all module parameters and aggregate them into the vehicle design processes. The database may help further constrain the design of the vehicle, simplifying the selection of the final configuration. In the background, the software may also compute the vehicle model, which includes the design of the controller (maps the user control input commands to vehicle actuator commands) and the required sensor commands. The design of the controller may require knowledge of complex matrix math. The user may not necessarily need knowledge of any of the aforementioned while configuring the reconfigurable vehicle with modules that may be mounted at discrete positions and at discrete angles when utilizing the software as provided herein. On a similar note, when the user uses the Manual Configurator the user may be deciding the vehicle design without the need for text based programming. Another advantage of discrete placement and angles may be that the user does not need to measure anything in order to assemble the vehicle. The physical vehicle configuration and design may be quickly reproduced by anyone that has visual representation of the vehicle showing the mounting location or having the mounting ID numbers.

Actuator Design

The actuator 3 illustrated in FIG. 8-18 has been designed to minimize drag and to be compact. A compact actuator is very important for a MUD 1, as the size of the actuator will affect minimum scale of the MUD 1. Current commercial thrusters that generate forces comparable to this thruster are 2×-5× longer than the thruster introduced. A longer actuator would increase the difficulty of configuring a MUD 1 as the body of the actuator would interfere with other actuators.

There are several key features that allow this thruster to remain compact and still generate a large amount of force. The first feature is a flat brushless motor that is comprised of a stator and a rotor 16. These motors generate a larger amount of torque than conventional motors which allows them to be used without a transmission.

The propeller shroud 3a protects the propeller 15 and directs flow through the inside of the shroud 3a. A single cantilevered support 3b is molded onto the shroud 3a and the motor housing 3d. A single cantilevered support 3b encases and guides the electric cable 3c from the motor housing 3d and out of the actuator 3. The actuator 3 has a cutout 3e at the intersection of the cantilevered support 3b and the shroud 3a that allows the cable to 3c to bend into the cutout 3e so that the actuator 3 can be mounted against a flat surface. A single cantilevered support 3b, decreases the amount of objects, such as weeds, that can get jammed against the propeller 15 and the actuator 3. Multiple supports, like observed in some off-the-shelf actuators, not only entrap more objects, but also multiple supports allow long and slender objects to wedge themselves among the supports and form more than one point of contact producing a torque that stalls the propeller 15.

Figure 21:
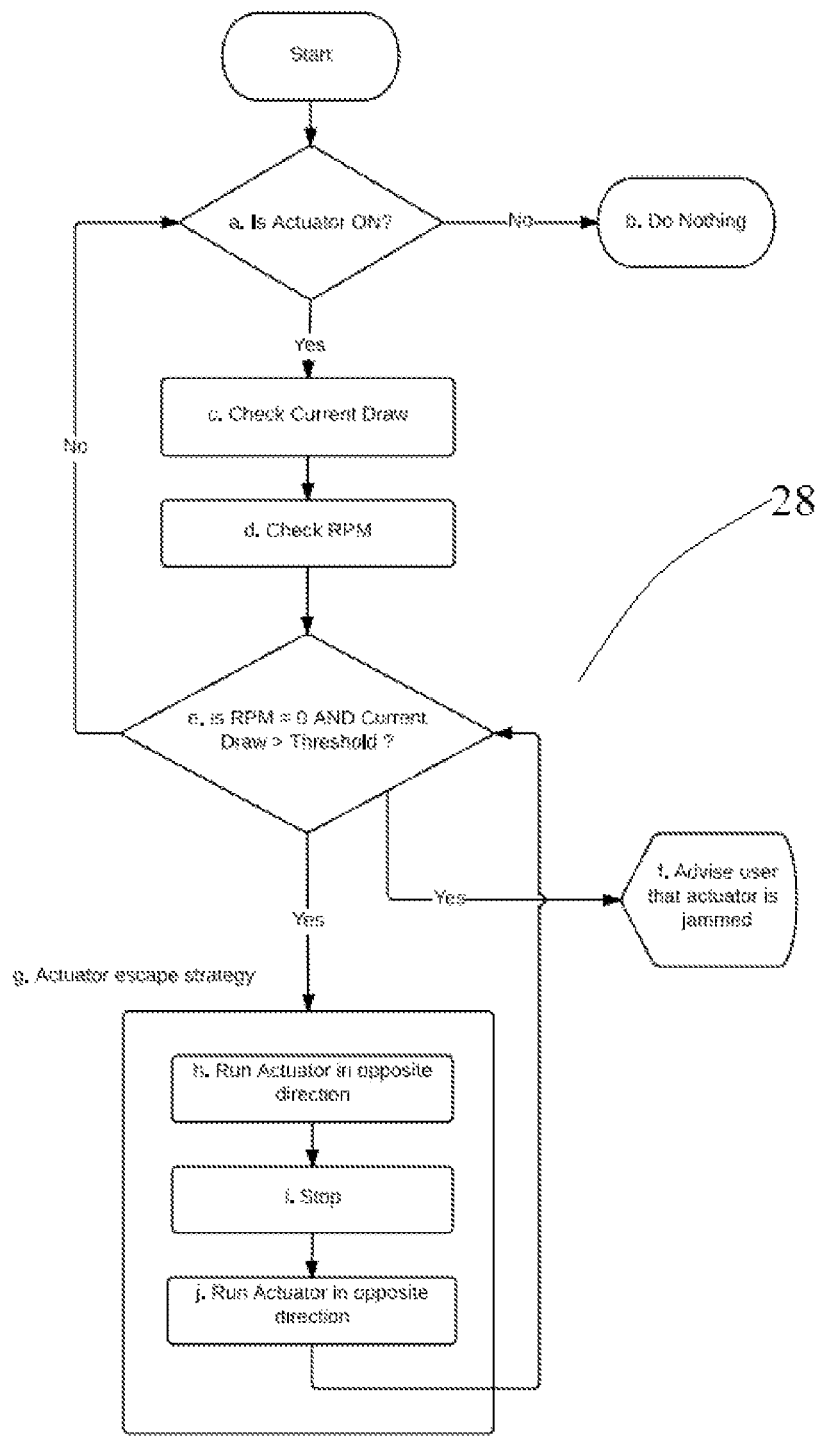
FIG. 21 provides an actuator unjamming algorithm, in accordance with embodiments.
Figure 22:
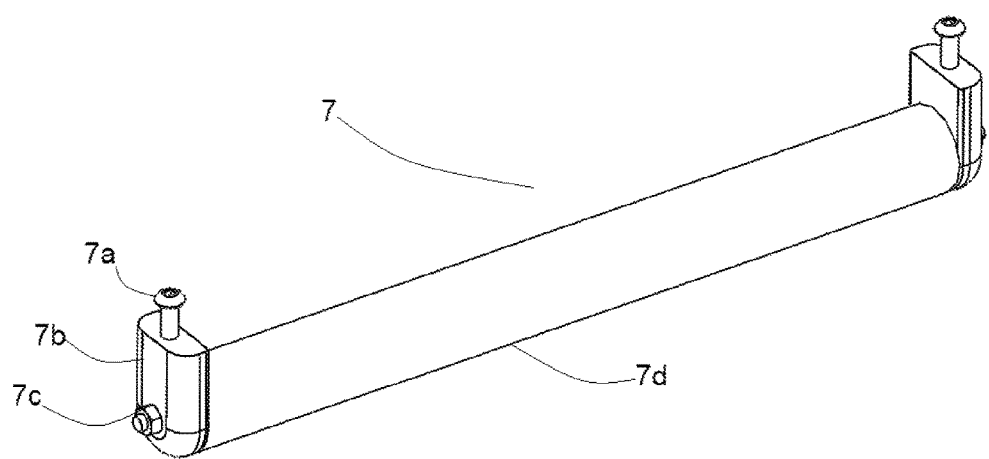
FIG. 22 provides a perspective view of the weight mechanism, in accordance with embodiments.
Figure 23:
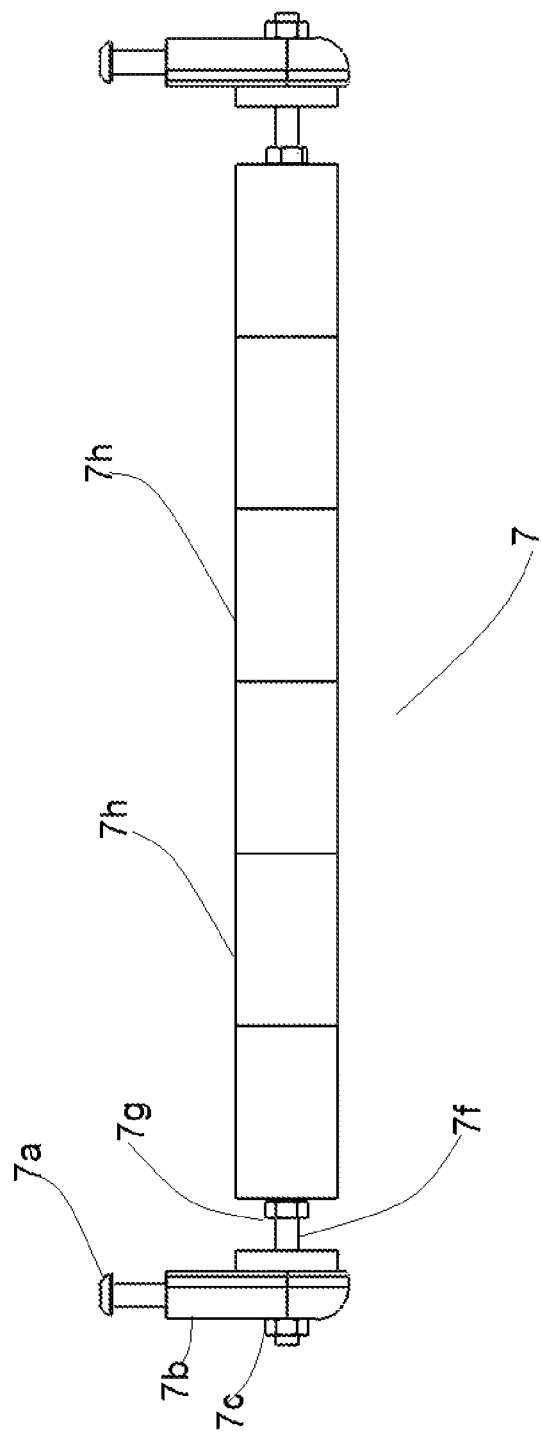
FIG. 23 provides a side view of the weight mechanism with the hollow housing removed displaying the weight, in accordance with embodiments.
Figure 24:
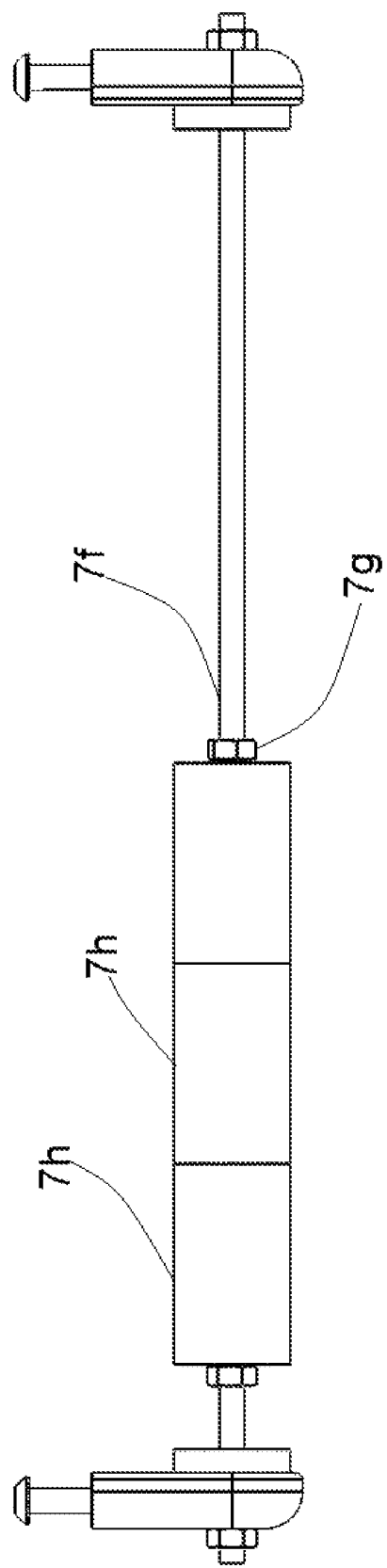
FIG. 24 provides a side view of the weight mechanism with the hollow housing removed and 3 weights shifted off center, in accordance with embodiments.

If objects where to get jammed into the actuator 3, a novel actuator unjamming algorithm 28 illustrated in FIG. 21 has been designed that decreases the chances of the actuator 3 becoming permanently tangled. The system works by first checking that the actuator 3 is on 28a. If the actuator 3 is not on, then the system does nothing. If the actuator is on, then the system checks the actuator's 3 current draw 28c and RPM 28d. If the RPM is zero and current draw is above preset threshold 28e, then the system advises the user that the actuator is jammed 28f and goes into an actuator escape strategy 28g which runs the actuator in the opposite direction 28h that is currently being commanded, it then stops the actuator 28i and then runs the actuator in the opposite direction 28j. The speed and duration that the actuator is run and stopped can be changed depending on actuator 3 type. The system continuously monitors all actuators 3 to ensure that none of them are jammed.

In order to minimize the actuator's 3 lateral drag and optimize space, the motor housing 3d is primarily found within the shroud 3a. The shroud 3a contains a modular joint 13 with a molded angle constraining mechanism 13g that allows the actuator 3 to be mounted at a plurality of angles with respect to the center axis of the modular joint 13 using a single fastener 13a.

Another notable feature of this actuator 3 is its simplicity. Simplicity in this case is achieved by minimizing the total amount of fasteners that hold the actuator 3 together to only two fasteners. The lower the amount of fasters, the more economical the design becomes and easier the actuator 3 is to service. The propeller 15 can be removed from the rotor 16 by removing a clip 16i and the rotor 16 can be removed from the actuator 3 by removing the clip 16f.

Figure 12:
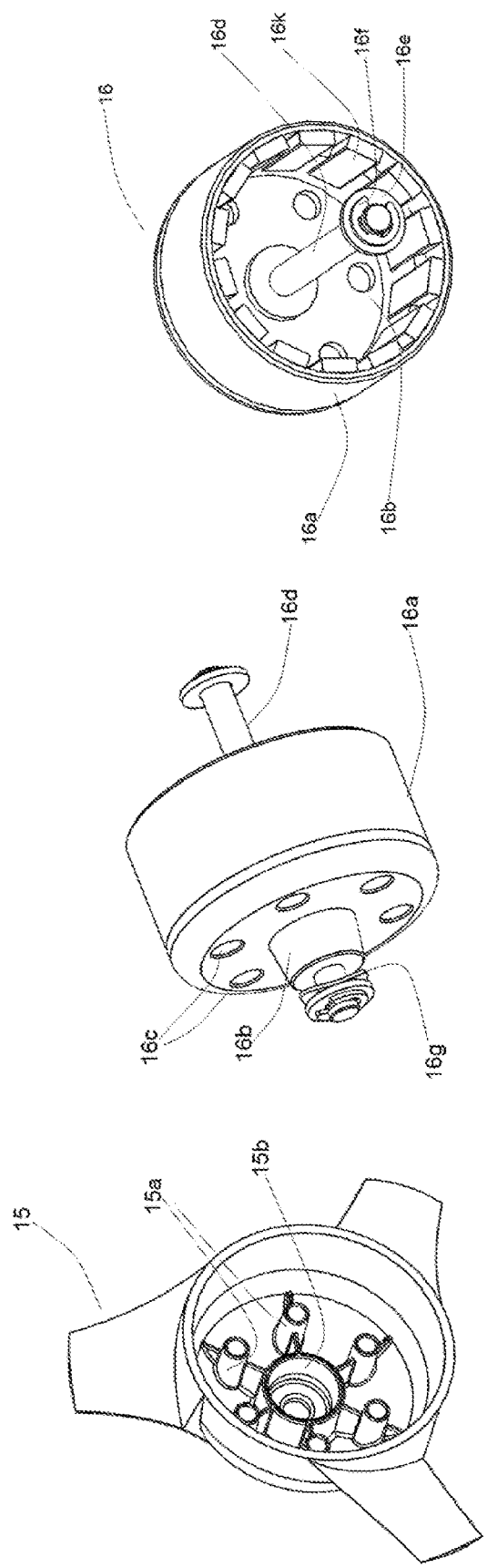
FIG. 12 provides a perspective view of rear of propeller (Left), perspective view of rotor assembly (Center), rear view of rotor assembly (Right), in accordance with embodiments.

The rotor 16 of the brushless motor shown in FIG. 12 is comprised of a stainless steel shaft 16d that is pressed onto a machined disk 16j. A metal ring 16a is permanently attached to the machined disk 16j that houses a series of magnets 16k as shown in FIG. 12. The machined disk 16a has a series of bores 16b that interlock with molded pins 15a on the inside of the propeller 15 insuring that the propeller 15 and machined disk 16j are secure in bi-directional torque along the center axis. A circular male cone 16c on the machined disk 16j wedges against the a circular female cone 15b on the center-backside of the propeller 15 insuring that the propeller 15 is always concentric to the machined disk 16j. A spring 16g installed on the outside of the propeller 15 removes any backlash along the length of the rotor by insuring that the circular male cone 16c and the circular female cone 15b are always pressed against each other. A flat washer 16h is placed between the clip 16i and the spring 16g to help and a flat washer 16e is placed between the clip 16f and the bearing 14b mounted on the motor housing 3d shown in FIG. 13 and FIG. 14.

Figure 14:
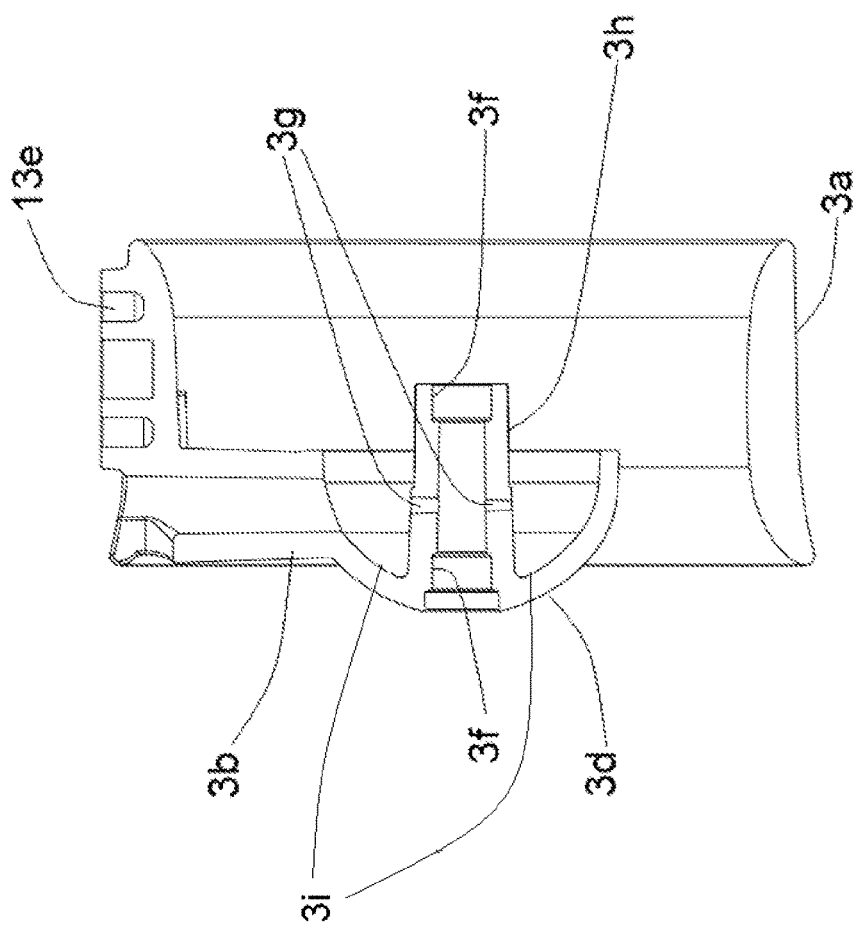
FIG. 14 provides a section view of actuator shroud, in accordance with embodiments.

The motor housing 3d houses the motor stator 14 and secures to concentric bearings 14a and 14b as shown in FIG. 13. A section view of the motor shroud 3a with the built-in motor housing 3d and cantilevered support 3b is shown in FIG. 14. This section view illustrates the two locations 3f where the bearings 14a and 14b are installed. A through-hole 3g is designed into the motor housing 3d between the two bushings 14a and 14b in order to clear-out excess water when the actuator 3 is not submerged. The stator 14 is press-fit and glued onto the stator mount section 3h.

Figure 15:
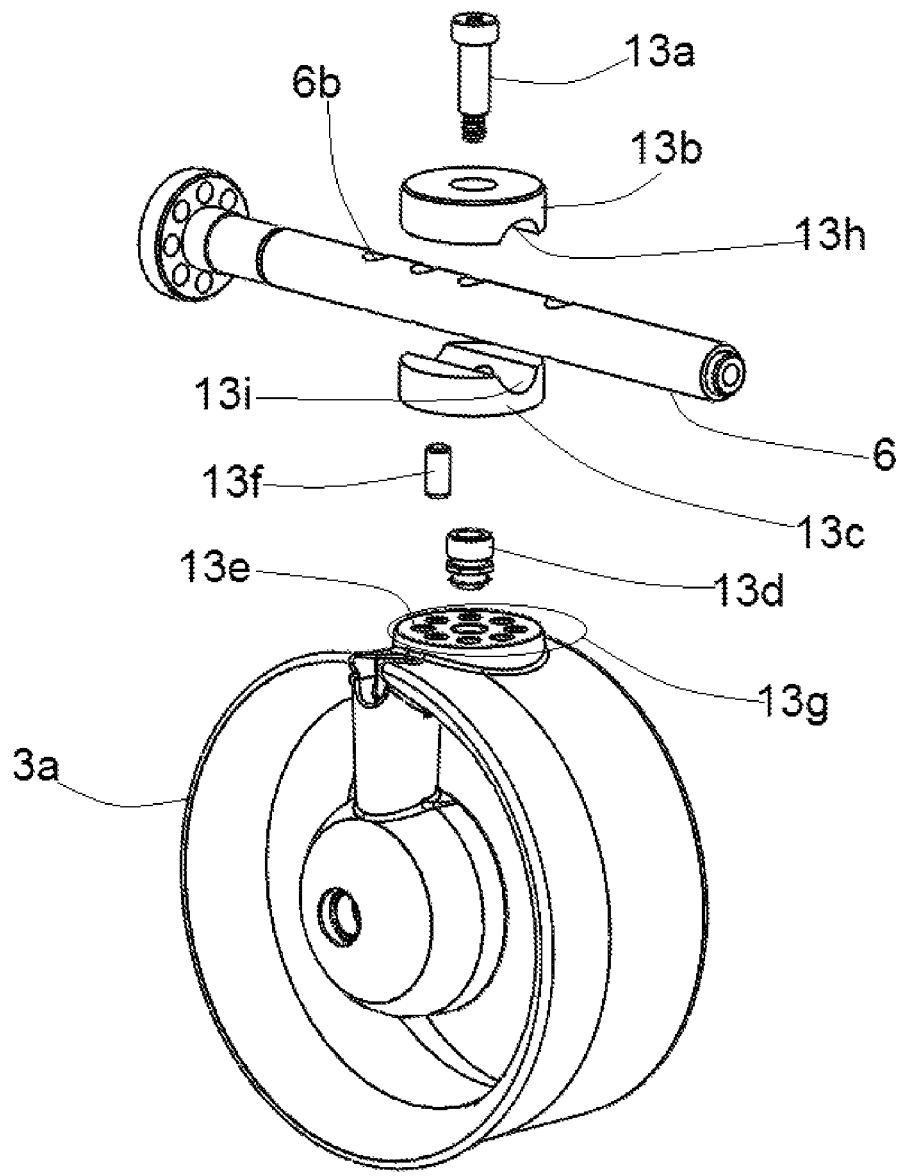
FIG. 15. provides a perspective view of the actuator shroud and with an exploded view of modular joint, in accordance with embodiments.

A metal insert 13d shown in FIG. 15 is captive inside the shroud 3a and is concentric to the modular joint 13. A fastener 13a threads to the metal insert 13d allowing the fastener 13a to sandwich the modular column joint 6 between the outer washer 13b and the pin washer 13c. The fastener 13a secures the actuator 3 in three axes of translation. The outer washer 13b has a cutout 13h that allows it to conform to the curvature of the modular column joint 6 and distribute the compression forces from the faster 13a on the modular column joint 6.

A pin washer 13c, has also a cutout 13i that fits against the modular column joint 6 and insures that both parts are constrained in rotation about the center axis of the modular joint 13 when both parts are compressed together by the fastener 13a and the metal insert 13d. In order to insure that the modular column joint 6 and the shroud 3 are constrained in rotation, the angle constraining mechanism 13g is comprised of a series of molded bores 13e that interlock with the pin 13f permanently insert into pin washer 13c. An actuator 3 that has been installed onto the MUD 1 using the modular joint 13 can be observed in FIG. 1 and FIG. 7.

Figure 19:
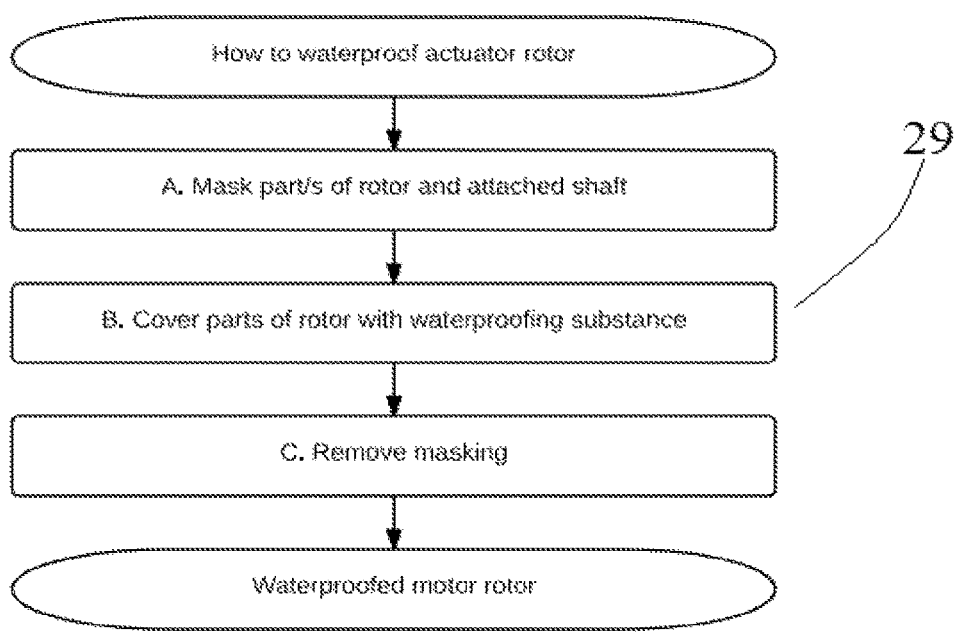
FIG. 19 provides a process used to waterproof actuator rotor, in accordance with embodiments FIG. 20 provides a process used to waterproof actuator stator and winding, in accordance with embodiments.

Another key innovation of the actuator 3 is the process used to waterproof the rotor 16, stator 14, and motor windings. The process used to waterproof the motor rotor 29 is illustrated in FIG. 19. The rotor 16 is comprised of a metal ring 16a and a plurality of magnets 16k that corrode when exposed to water and therefore a waterproofing substance 29b, such as a paint, epoxy, etc. is applied to the rotor 16 excluding the inside of the bores 16c, the face in front and behind the bores, and the circular male cone area 16b. Some parts of the rotor 16 should not have waterproofing substance 29b and therefore they must be masked 29a before and unmasked 29c after applying the waterproofing substance 29b.

Figure 20:
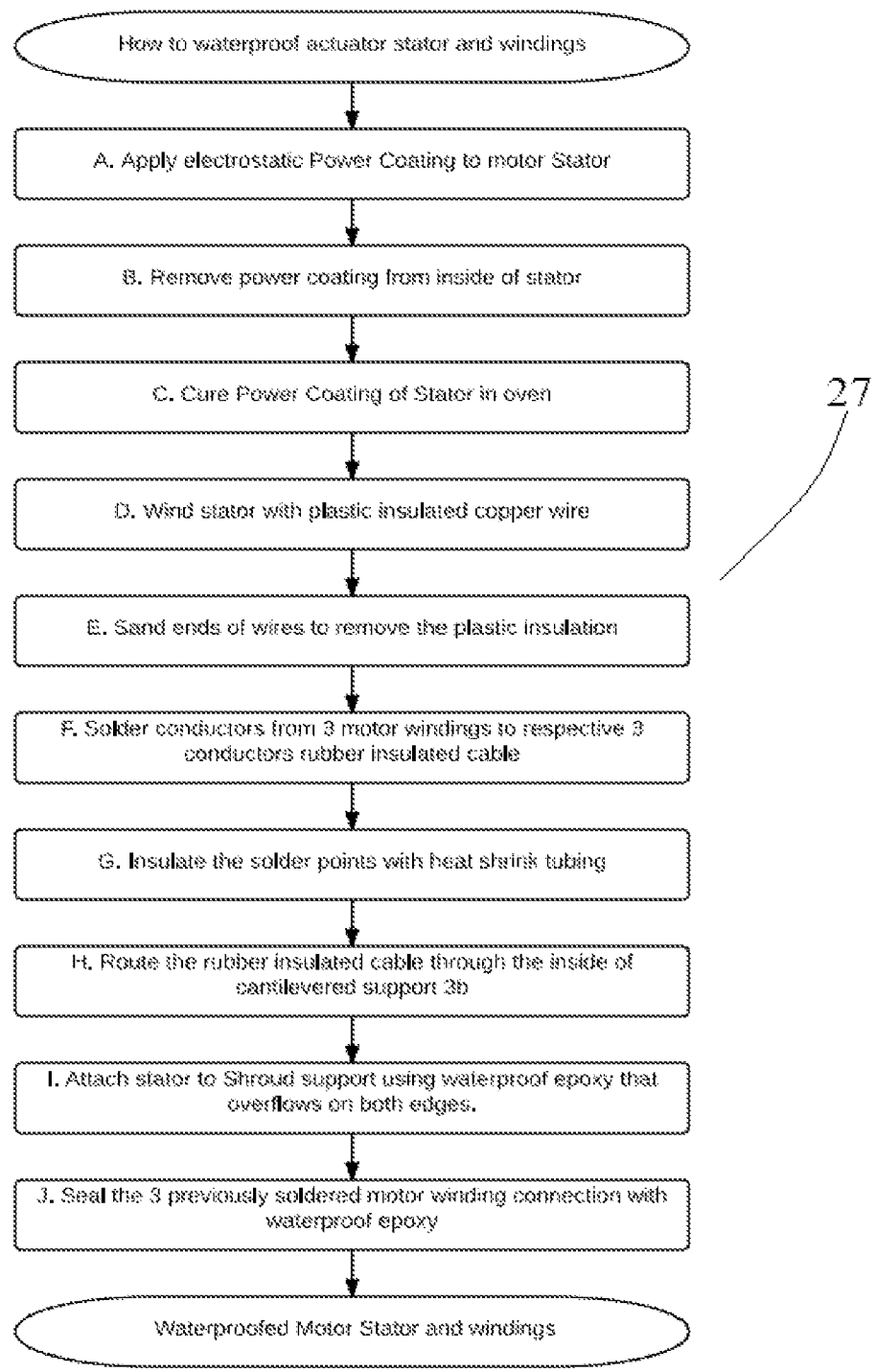

The process to waterproof the motor stator is illustrated in FIG. 20. Power coating 27a is applied all around the unwound stator 14 to waterproof the stator 14. Typically electrostatic power coating is applied on motor stators to prevent winding shorts. In this case we use it to insure that the stator 14 will not corrode when submerged in water for prolonged periods of time. The electrostatic power coating is removed 27b from the inside of the stator 14 in order to maintain the press-fit tolerance when mounting the stator 14 onto the stator mount section 3h. The stator 14 is placed in an oven to cure the electrostatic power coating 27c.

The stator 14 is then wound with a plastic insulated copper wire 27d. The plastic surrounding the copper wire prevents the wire from corroding. Once the stator 14 is wound, 3 motor stator windings with one or multiple copper wires will result. A 3-6 mm length section at the end of each of those copper wires from the 3 stator windings must be sanded to remove the plastic insulation 27e. Each of the 3 motor stator windings must then be soldered 27f to a conductor on the 3 conductor electric cable 3c and each solder point is insulated 27g to insure that the 3 motor windings solder points do not contact each other. The cable 3c is then routed through 27h the inside of the cantilevered support 3b from the inside of the motor housing 3d in the direction of the cutout 3e. Attach stator 14 to stator mount section 3h 27i using waterproof epoxy and insure that epoxy will cover the edge between the inside of the stator 14 and the front and back face of the stator 14. Seal the 3 previously soldered motor winding connections with waterproof epoxy 27j by completely encapsulating the solder points. The result is a stator that will not corrode in when exposed to water. The waterproofed stator 14 and rotor 16 method can also be used to create actuators for a gripper, a gimbal, an articulated arm, etc.

Modular Weight Mechanism

A weight mechanism 7 shown on the MUD 1 in FIG. 1, FIG. 3, and FIG. 22-24 allows the MUD's 1 mass and center of mass to be adjusted. The weight mechanism 7 is especially important in a modular vehicle were the number of actuators 3 can vary depending on the MUD 1 design. The weight mechanism 7 allows placing and removing modular weights 7h on the vehicle to correspond to the weight of an actuator.

A weight mechanism 7 allows the vehicle's center of mass (COM) to be low when the MUD 1 is under-actuated. An under-actuated vehicle means that there are not enough actuators 3 available to control all available degrees of freedom of the MUD 1 (total of six degrees of freedom). Therefore, in such a case, it is desirable for the vehicle to be passively stable, meaning that the center of buoyancy of the vehicle must be above and as far away from the COM as possible to keep the vehicle upright. When actuators 3 are added to the MUD 1, weights 7h must be removed from the weight mechanism 7 because the MUD 1 has a finite amount of buoyancy and the actuators 3 are negatively buoyant. The two weight mechanisms 7 located on the bottom of the MUD 1 also doubles as a skid.

The modular weight mechanism 7 is attached to the bottom side of the bottom plate 5 by using two fasteners 7a that are threaded into two brackets 7b on either extreme of the modular weight mechanism 7. The brackets 7b are spaced by a hollow housing 7d and are clamped to either end of the hollow housing 7d by a threaded rod 7f and two fasteners 7c on the outside of the brackets 7b. The hollow housing 7d insures that drag parameters are not affected by the number of weights 7d inside the modular weight mechanism 7. A plurality of weights 7h can be added/removed from the modular weight mechanism 7. Once the weights have been added/removed, fasters 7g on the outside of the weights 7h are pressed against the weights 7h to prevent them from moving inside the modular weight mechanism 7.

The modular weights 7h can be shifted on the inside of the modular weight mechanism 7 and secured off-center by the fasteners 7g and the treaded rod 7f. Shifting the weights off-center is typically done when a payload or an actuator configuration causes MUD 1 to tilt in either pitch or yaw indicating that the COM of the MUD 1 is not aligned with the center of buoyancy along the gravity vector.

Water-Tight Compartment

Figure 26:
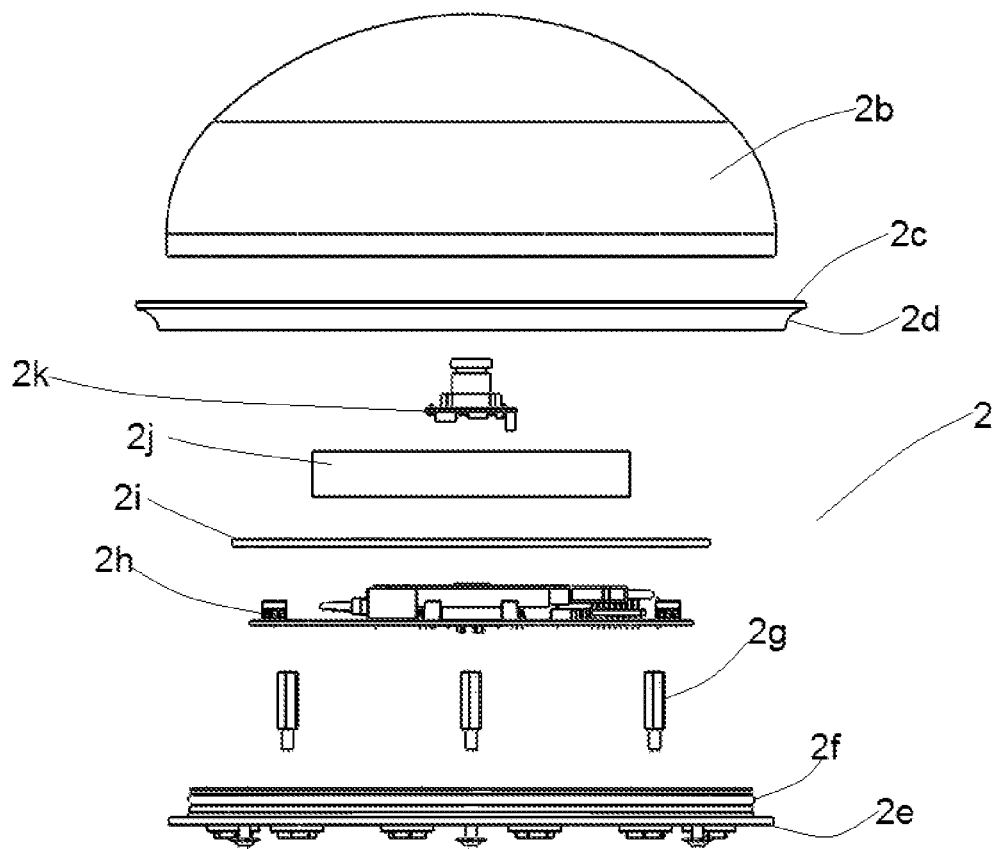
FIG. 26 provides a side and exploded view of the water-tight compartment, in accordance with embodiments.

The water-tight compartment 2 (WTC) is located on the top of the MUD 1 as shown in FIG. 1 and is designed to house the main electronics 2h and power system 2j that run the MUD 1. The WTC 2 has a plurality of modular electronic entry points 2a where electrical connectors 21 like the one pictured in FIG. 30 can be installed. When no electrical connecter 21, is used a plug 9 can be installed to seal the modular electronic entry point 2a. The electrical connector 21 is comprised of a screw 21c that is secured by a molded section 21e to a cable 21f. The screw 21c is inserted through an electronic entry point 2a and across the bulkhead 2e. An O-ring seal 21b is compressed against the bottom side of the bulkhead 2e by tightening a fastener 21a on the top side of the bulkhead 2e. The WTC 2 is depicted in further detail in FIGS. 26 and 27. The WTC 2 contains a series of fasteners 21 that secure the WTC 2 to the top plate 4. The WTC 2 has been designed as the primary source of buoyancy for the MUD 1 eliminating the need for a secondary floatation unit. The uppermost location of the WTC 2 on the MUD 1 concentrates the buoyancy forces as high as possible in order to create a pendulum-like effect with the COM of the MUD 1 and make the device passively stable.

Figure 25:
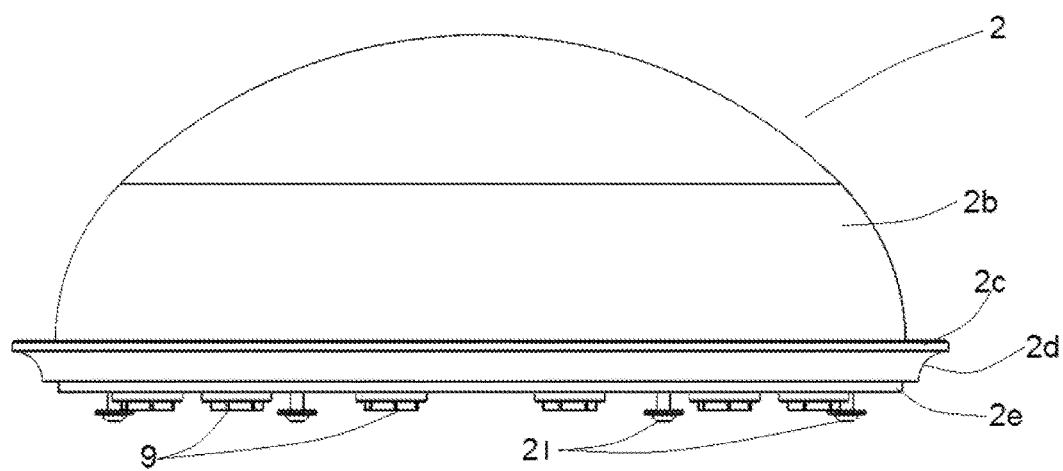
FIG. 25 provides a side view of the water-tight compartment, in accordance with embodiments.

The WTC 2 top location allows the user to access the main electronics 2h and power system 2j easily by removing the top shell 2b with the top ring 2c without the need to disconnect any electrical connectors 21. The top shell 2b is a concave shape which offers structural strength at large depths. The WTC 2 is symmetric about x-y plane (View shown in FIG. 25) in order to improve handling and control of the MUD 1 in omnidirectional water currents because the WTC 2 has equal drag when translating. The circular shape of the WTC 2 has symmetric drag when moving vertically.

This symmetry also makes half the stability derivatives zero, simplifying the identification of the drag coefficient. The WTC 2 is located outside of frame that insures that minimum number of actuator configuration are obstructed.

The WTC 2 contains a top shell 2b that is manufactured of a clear material. The top shell 2b is permanently secured to the top ring 2c which is precisely manufactured in order to be able precisely engage the tangential seal 2f on the bulkhead 2e. The top ring 2c can be removed from the WTC 2 using lip 2d designed into the top ring 2c as a handle. The user can place his/her fingers under the lip 2d and use the top plate 4 for leverage. To close the WTC 2, the user simply needs to push on the shell 2b that is permanently attached to the top ring 2c until the bottom of the top ring 2c reaches the top of the top plate 4.

Figure 29:
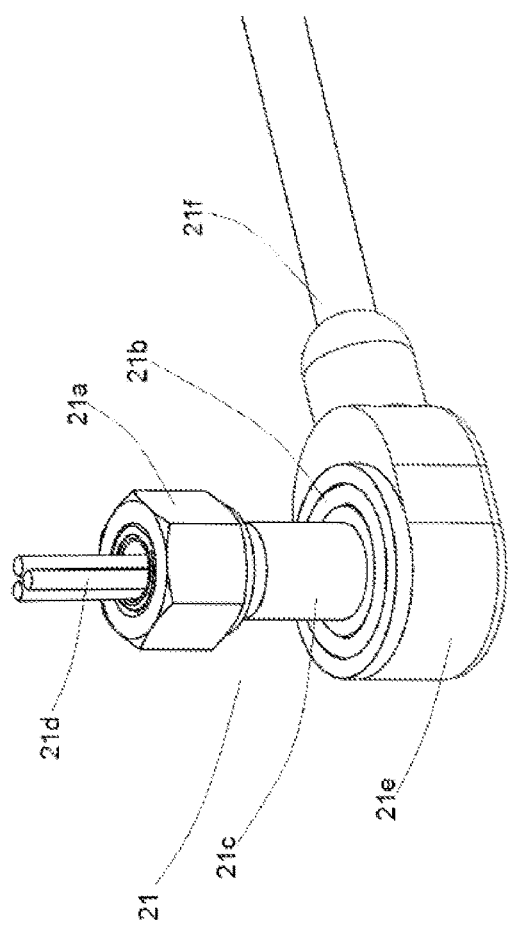
FIG. 29 provides a perspective view of exhaust valve assembly (Left), perspective and exploded view of exhaust valve assembly (Center), perspective view of electrical connector (Right), in accordance with embodiments.
Figure 29:
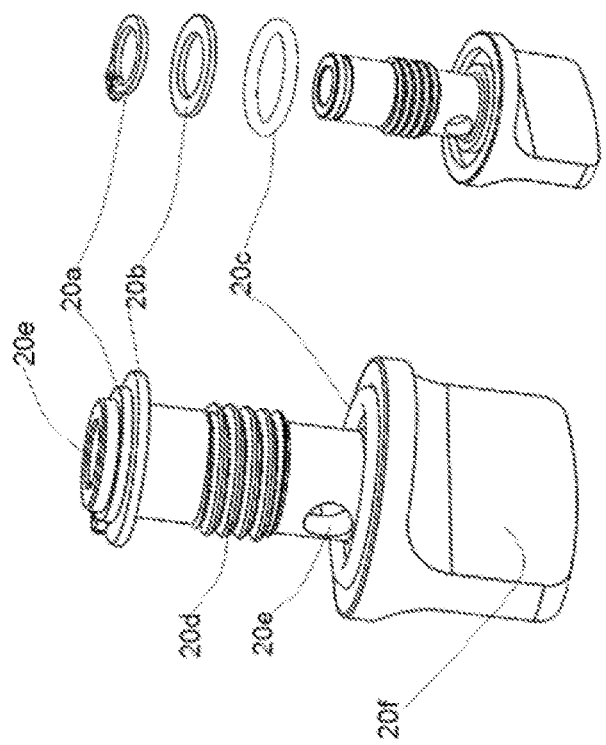

Air must be exhausted through the WTC 2, in both opening and closing operations. An exhaust valve 20 has been designed to be operated manually by turning the handle 20f pictured in FIG. 29. The exhaust valve 20 threads onto any of the electronic entry points 2a on the bulkhead 2e. When fully closed, a seal 20c is compressed between the exhaust valve 20 and the bulkhead 2e sealing off air and water. When the exhaust valve 20 is opened, air is allowed to flow across the holes 20e. The stopper 20a prevents the exhaust valve 20 from being removed completely from the bulkhead 2e and the washer 20b prevents the stopper 20a from scratching the bulkhead 2e. The stopper 20a also lets the user know when the stopper 20a is fully open.

The main electronics 2h are located on the topside of the bulkhead 2f. The location of the main electronics 2f permits the electronic connectors 21 that enter the WTC 2 to be directly plugged into the main electronic board 2h. The main electronic board 2h will have a plurality of modular electronic connectors that allow a plurality of motor drivers to be plugged-in. The motor drivers control the power and speed into the actuators 3. The motor drivers has a current sensors and RPM sensor that monitors the current into each motor and the speed. The motor driver has closed-loop control that enables the user to command a desired RPM and the motor driver will automatically reach the desired RPM regardless of the motor load and disturbances on the motor. The user can quickly plug-in a motor driver onto the main electronic board 2h to match the number of actuators 3 required.

Spacers 2g hold a shelf 2i that help support the power system 2j above the main electronic board 2h. A camera 2k is located above the battery 2j, which allow the MUD 1 to observe items directly above it without the need to create a second waterproof housing for the camera.

Figure 27:
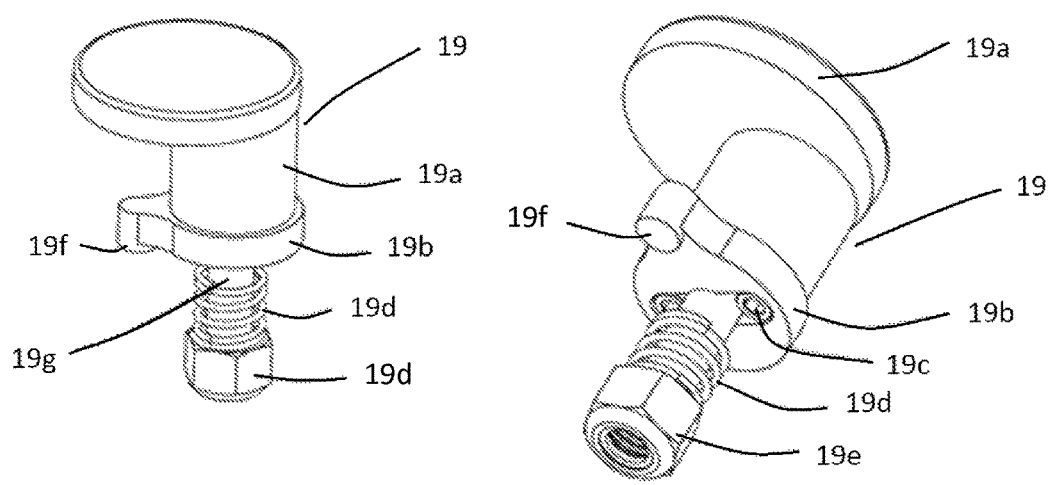
FIG. 27 provides a top perspective view of the pivot lock (Left) and a bottom perspective view of the pivot lock (Right), in accordance with embodiments.
Figure 28:
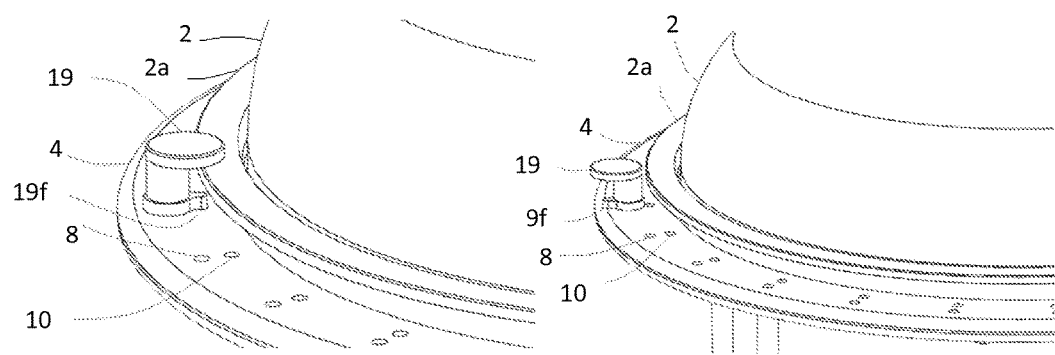
FIG. 28 provides a perspective view of the pivot lock on the MUD in closes position (Left) and open position (Right), in accordance with embodiments.

A plurality of pivot locks 19 illustrated in FIG. 27 and FIG. 28 are used to insure that the top ring 2c remains against the top plate 4 which insures that the tangential seal 2f remains engaged on the inside of the top ring 2c. A plurality of pivot locks 19 can be secured to the top plate's 4 fixing mechanism 8. The pivot locks 19 are constrained in position, but are free to rotate inside the fixing mechanism 8 about the locating section 19g. The pin plate 19b is secured to the pivot lock's lower section with fasteners 19c insuring that the pin plate 19b and the pivot lock's upper section 19a form a rigid body. The bottom side of the pin plate 19b sits against the top side of the top plate 4. A spring mechanism 19d is centered on the pivot lock's locating section 19g and is placed against the bottom side of the top plate 4. A fastener 19e insures that the pivot lock 19 remains on the fixing mechanism 8 and that the spring 19d is compressed and is pulling the pin 19f against the top side of the top plate 4. The fastener 19e is purposely installed with some backlash; meaning that the pivot lock's upper section 19a and pin plate 19b can be pulled manually creating a gap between the bottom side of the pin plate 19b and the top plate 4. The gap must be greater than the height of the pin 19g in order to allow the pin 19g to be completely extracted from the locking holes 10. The user can therefore move the pivot locks 19 to an unlocked position with a single hand by pulling on the pivot lock's upper section 19a which will extract the pin 19f from the locking holes 10 and then by rotating the pivot lock 19. The pivot lock 19 is illustrated in both a closed and open position in FIG. 28.

Figure 30:
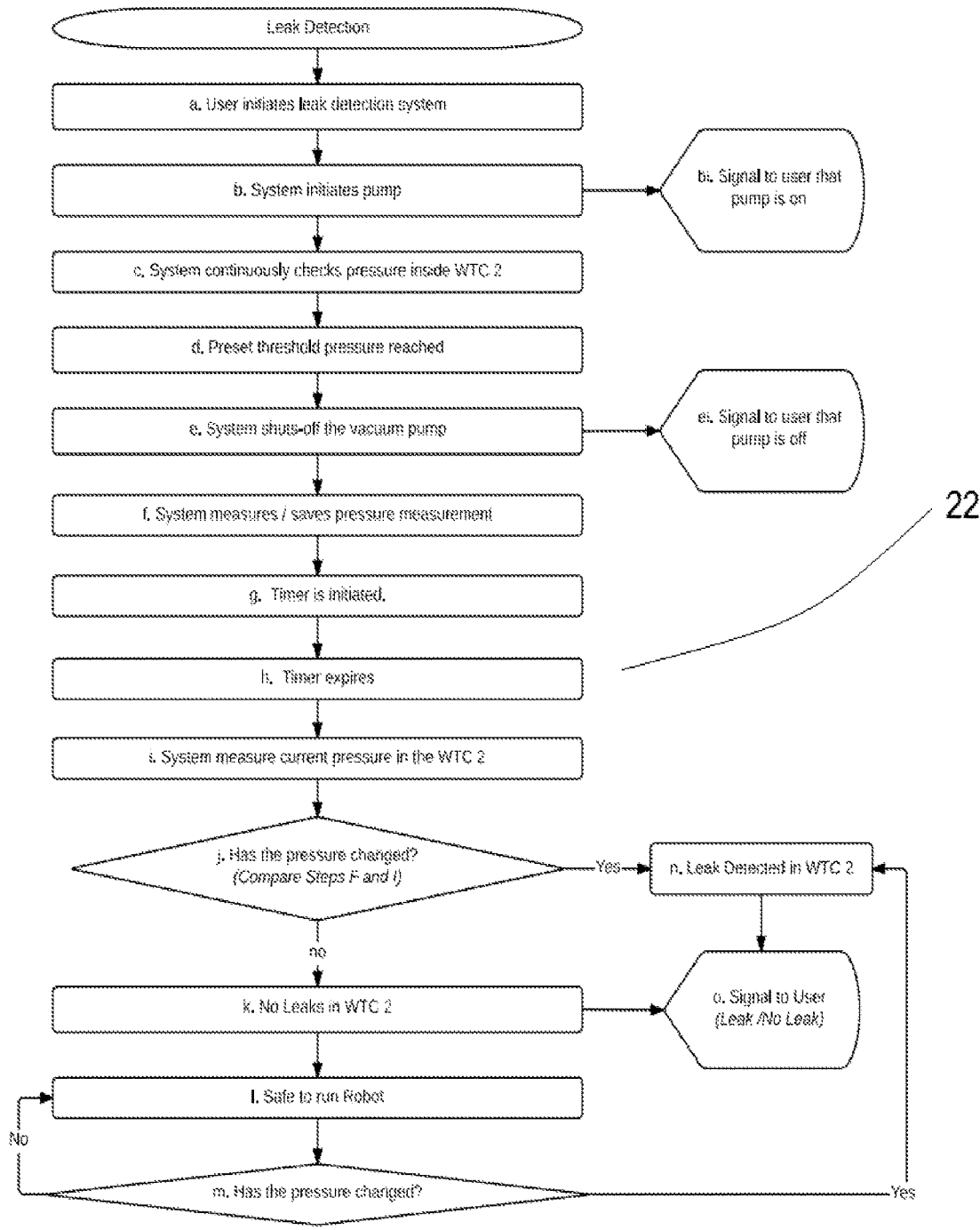
FIG. 30 provides a leak detection system, in accordance with embodiments.

A leak detection system 22 that verifies that the WTC 2 is waterproof has been designed and is illustrated in FIG. 30. The user first initiates the leak detection system 22a by pressing button on the user interface. The system will then initiate a pump 22b that is in series with a check valve to lower the pressure inside the WTC 2 with respect to the pressure outside the WTC 2. At the same time, a signal will be transmitted to the user letting him/her know the pump is on 22bi. A pressure sensor is placed inside the WTC 2 and is mounted on the main electronics board 2h. The system continuously checks the pressure inside the WTC 2 22c and shuts off the pump 22e once a preset threshold pressure has been reached 22d and signal the user that the pump is off 22ei. The last measured pressure after the pump was turned off will be recorded 22f and a timer will be initiated 22g. After the timer has elapsed 22h, the system will measure the current pressure inside the WTC 2 and compare with the previous pressure measurement 22j. If the pressure has changed, the system detected a leak 22n in the WTC 2 and a signal signifying leak 22o will be sent to user. If the pressure has not changed, it means that there are not detected leaks 22k in the WTC 2 and a signal signifying no leaks 22o will be sent to user. If no leaks are detected, the robot is the water 22l. The system will continuously check the pressure 22m inside the WTC 2 while the MUD 1 is in operation. If a change is noticed while in operation, an alert will be sent to the user 22o signifying a leak.

Automatic Vehicle Configurator

Figure 31:
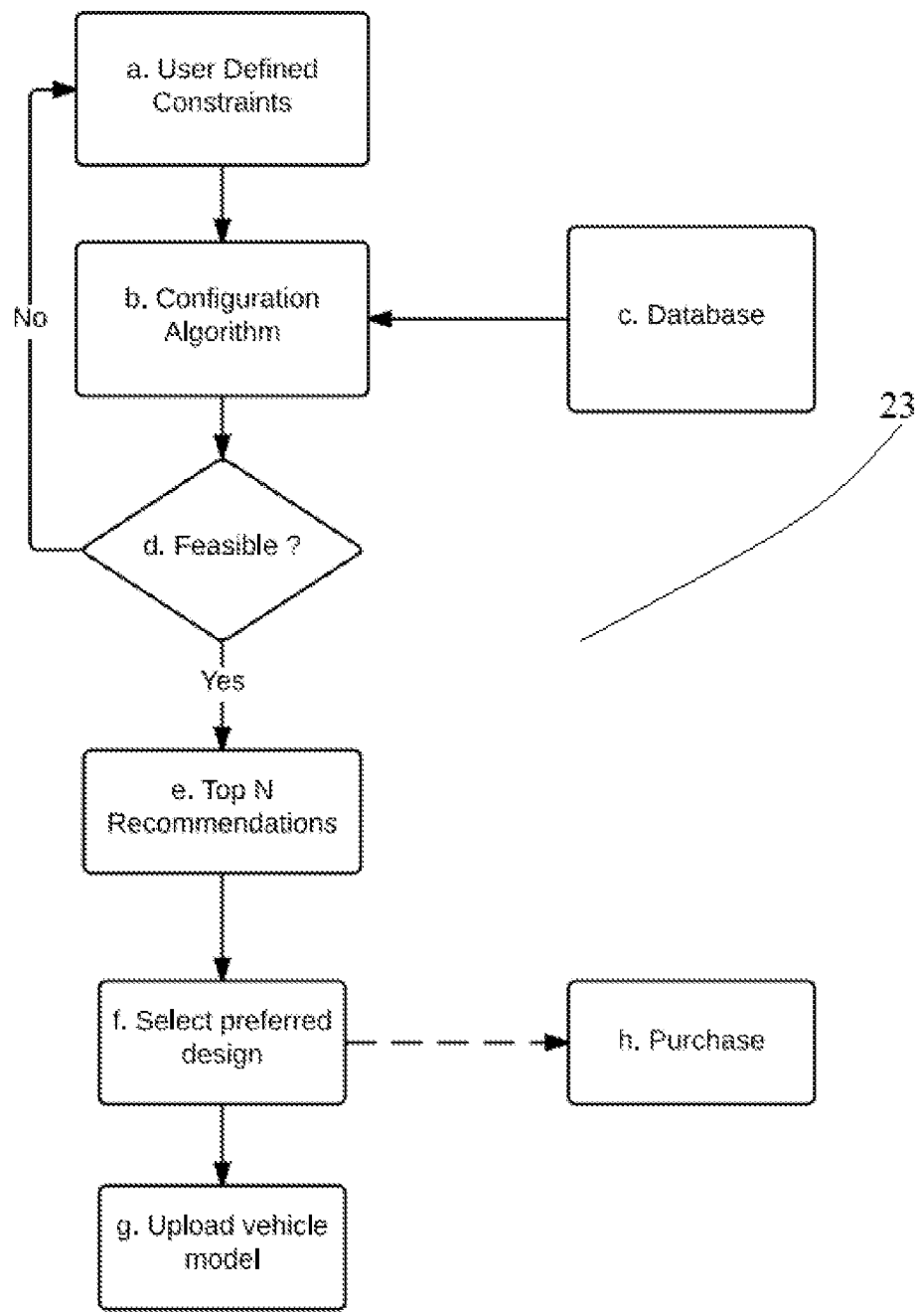
FIG. 31 provides an Automatic Vehicle Configurator, in accordance with embodiments.

The Auto Vehicle Configurator 23 illustrated in FIG. 31 has been designed to map User Defined Constraints 23a to a Preferred Vehicle Design 23f. The configuration algorithm 23b takes in User Defined Constraints 23a such as: payload parameters (drag, mass, COM, COD, surface roughness, etc.), desired vehicle degrees of freedom, desired velocities, forced and moment capabilities, desired tool end-effector forces, water current conditions, and maximum number of actuators, etc. In some cases, the user may not know drag parameters of the payload that he/she wants to use, furthermore the effects of drag of an object can change depending on how the object interacts with the structure of the vehicle; therefore in some cases within the User Defined Constraints 23a, the user will have the option to upload a 3D model of the payload and determine its placement on the vehicle. The Auto Vehicle Configurator 23 would use this information as one of the input constraints for the Configuration Algorithm 23b.

The Auto Vehicle Configurator 23 then uses a Configuration Algorithm 23b that uses the User Defined Constraints 23a and a Database 23c that contains information of the vehicle structural components (I.e. frame options, mount types, WTC, etc.), different type of sensors, possible actuators and their respective force-frequency response model. Each component in the library will have information to aid in determining vehicle performance (I.e. mass, COM, drag, COD, mounting constraints, cost, etc.). The Configuration Algorithm 23*b* will then process the User Defined Constraints 23*a* and query the specification of available modular components from Database 23*c* and determine if a vehicle configuration is Feasible 23*d*.

If a vehicle configuration is Feasible 23*d*, then the Configuration Algorithm 23*b* will output the Top N recommendations 23*e*. The Top N recommendations 23*e* will contain information such as placement of actuators, plurality of actuators, shape and scale of structure and actuators, cost to make the vehicle recommended, vehicle performance, suggested number of modular weights 7*h* in weight mechanism 7, type/size of WTC, Bill of Materials, COM, COD, mass of vehicle, buoyancy of vehicle, battery life runtime estimate, etc.

Outputting the Top N Recommendations 23*e* is important because first N-best solution could be very close to the second N-best solution and the user might prefer the second N-best solutions because it fulfills a constraints that is not addressed in step 23*a* or that is qualitative such as the aesthetics of the vehicle. Each of the N-best solutions will be ranked on how well they adhere to the constraints specified by the user. The N-best solutions can be further divided into categories. For example, the user could select the N-best solutions that minimizes the number of actuators or the N-best solutions that maximize velocity, N-best solution that minimizes cost, etc. The user could also select any of the N-best solutions and test the vehicle design in simulation before Selecting the Preferred Design 23*f*. Once the user Selects the Preferred Design 23*f*, he/she will be able to Upload the Vehicle Model 23*g* to the physical vehicle processor. In one instance, the Upload Vehicle Model 23*g* will have a single-click function on the graphical interface that maps the selected configuration to the central processor on the vehicle. Once the user has Uploaded the Vehicle Model 23*g* he/she will use the graphical user interface showing the Selected Preferred Design 23*g* as the building plan or instructional manual. The user will be able to rotate the vehicle and zoom in on the mounts and components to determine how to copy the design on the screen to the real vehicle. By selecting on the component, the user will get the mount ID number which will tell the user more explicitly where to place the component and at what angles.

The Auto Vehicle Configurator 23 can be found on a website, on a separate device, or can be built into the vehicle. Optionally, the Auto Vehicle configurator 23 also allows a person to Purchase 23*h* the vehicle after they have Selected the Preferred Design 23*f*. In the preferred embodiment described previously, the user will be able to quickly configure the MUD 1 using modular column joints 6, modular joints 13, the fixing mechanism 8, and the modular weight mechanism 7, etc. A similar method can be used to design an underwater robot for a single use (The vehicle does not need to be reconfigurable or modular). Once the user has Selected the Preferred Design 23*f*, a fabricator can manufacture the vehicle for a single task. The construction of the vehicle does not need to be modular like the MUD 1.

Manual Vehicle Configurator

Figure 32:
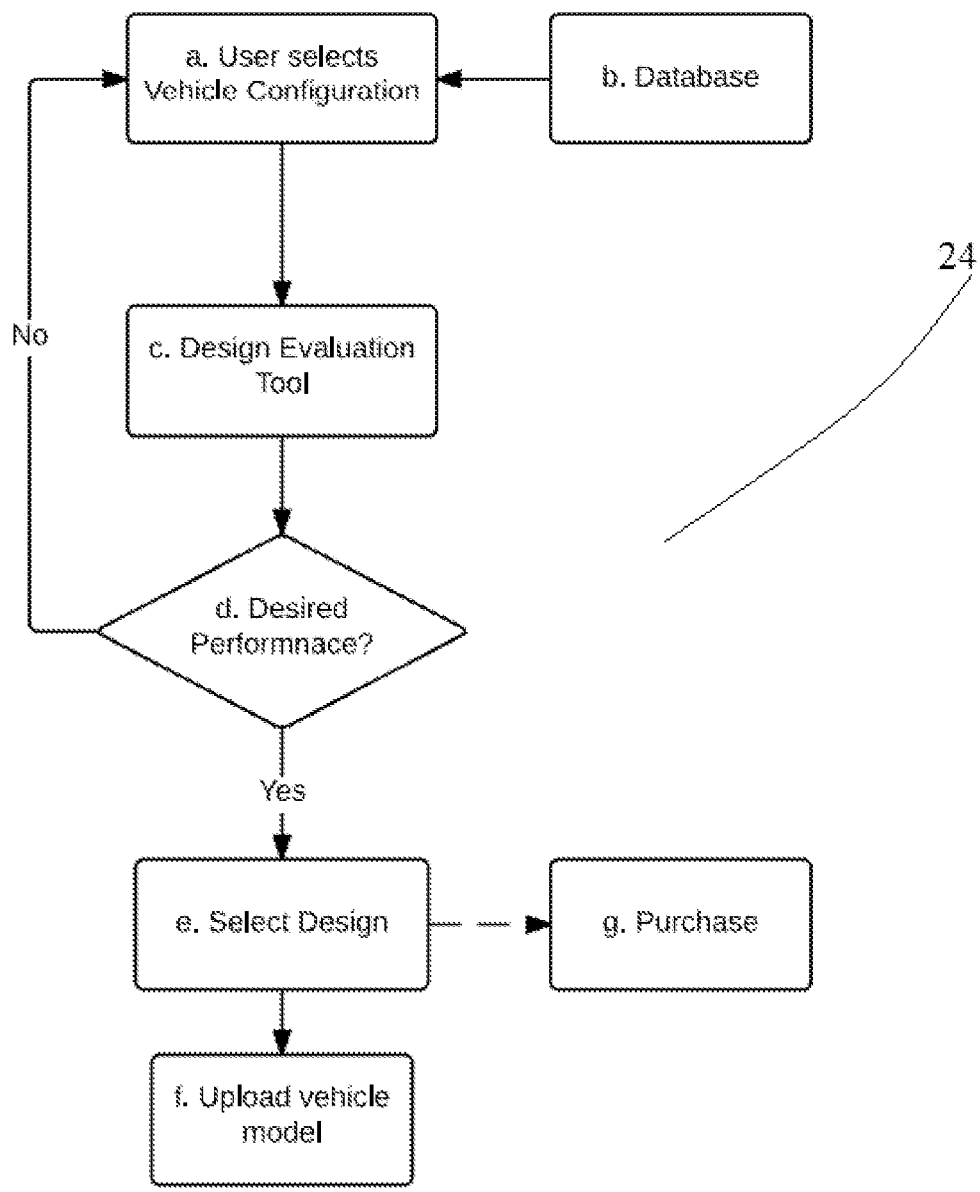
FIG. 32 provides a Manual Vehicle Configurator, in accordance with embodiments.

Depending on the task, a vehicle will require different payloads (Sensors, gripper, tools, etc.) which can vary greatly and can conflict with actuator mounting locations on the vehicle frame. Therefore, the N-best Recommendation 23*e* might not be feasible due to mechanical constraints. While the user could specify which mounting locations are off limits in the User Defined Constraints 23*a*, another method to configure a vehicle called Manual Vehicle Configurator 24 is proposed shown in FIG. 32 that allows the user to design the vehicle from scratch.

Designing an underwater vehicle requires a large amount of correlating information to insure that the vehicle will function properly, such as: Center of Mass, Center of Drag, force/moment feasibility space, buoyancy, and the controller design, etc. When using the Manual Vehicle Configurator 24, the user will select the vehicle configuration 24*a*. A Database 24*b* will be provided that includes information of the vehicle structural components (I.e. frame options, mount types, WTC, etc.), different type of sensors, possible actuators and their respective force-frequency response model. Each component in the library will have information to aid in determining vehicle performance (I.e. mass, COM, drag, COD, mounting constraints, cost, etc.). In addition, a 3D models of each component will be provided. The user will proceed to use the components in the Database 24*b* to configure the vehicle 24*a* by importing 3D models of the components from the Database 24*b* into a virtual 3D environment that allows the user to visualize and arrange components to form a vehicle. The user can easily configure the vehicle in a virtual environment using an intuitive graphical user interface instead of text based programming. More specifically, the user will be able to select discrete mounting points on all the components in the Database 24*b* to simplify the use of the Manual Vehicle Configurator 24. The Manual Vehicle Configurator 24, in some cases could be more procedural, meaning that the user has to first select one type of component vs. another. In one example illustrated in FIG. 35, the structure of the vehicle is used as the starting point. In this example, the user would start with the vehicle structure and determine an actuator 3 mounting location on the vehicle structure in a virtual 3D configurator 30. The vehicle would be rendered in 3D and the user will be able to rotate the virtual vehicle. The MUD 1 would appear on the screen showing the locations that the user can select, like illustrated in FIG. 30*a*. The mounting point that the user selects will be highlighted as shown in FIG. 30*b*. Mounting some actuators 3 or other components require multiple inputs into the virtual 3D configurator 30. The next input or second constraint, in this example, is the height along the column 30*c*. The user will have the choice to select amount a plurality of mounting location along the height of the column. The selected location will be highlighted as shown in step 30*c*. Once the placement of a component has been fully defined, the user will be given the choice of selecting what component they want to place in that location from the Database 24*b*.

Figure 35:
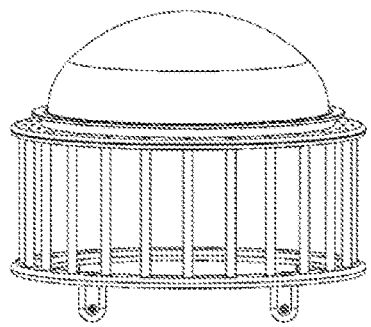
FIG. 35 provides a virtual 3D configurator, in accordance with embodiments.
Figure 35:
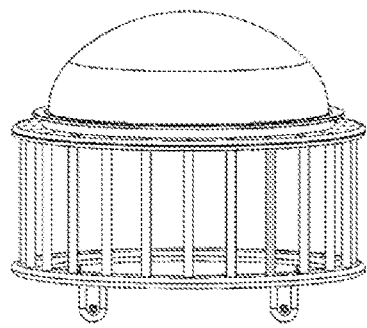
Figure 35:
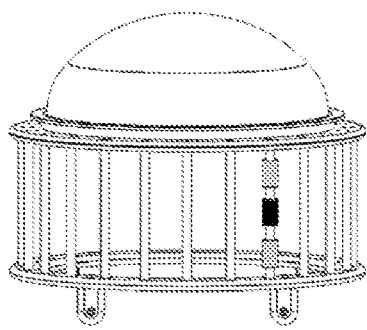
Figure 35:
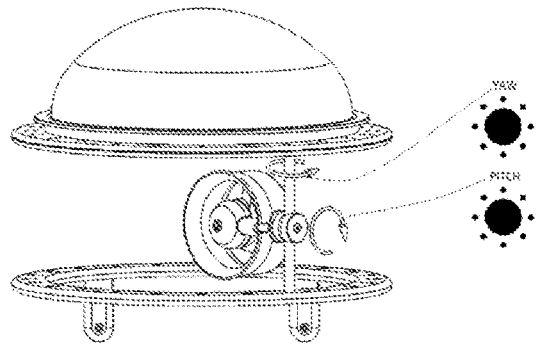
Figure 36:
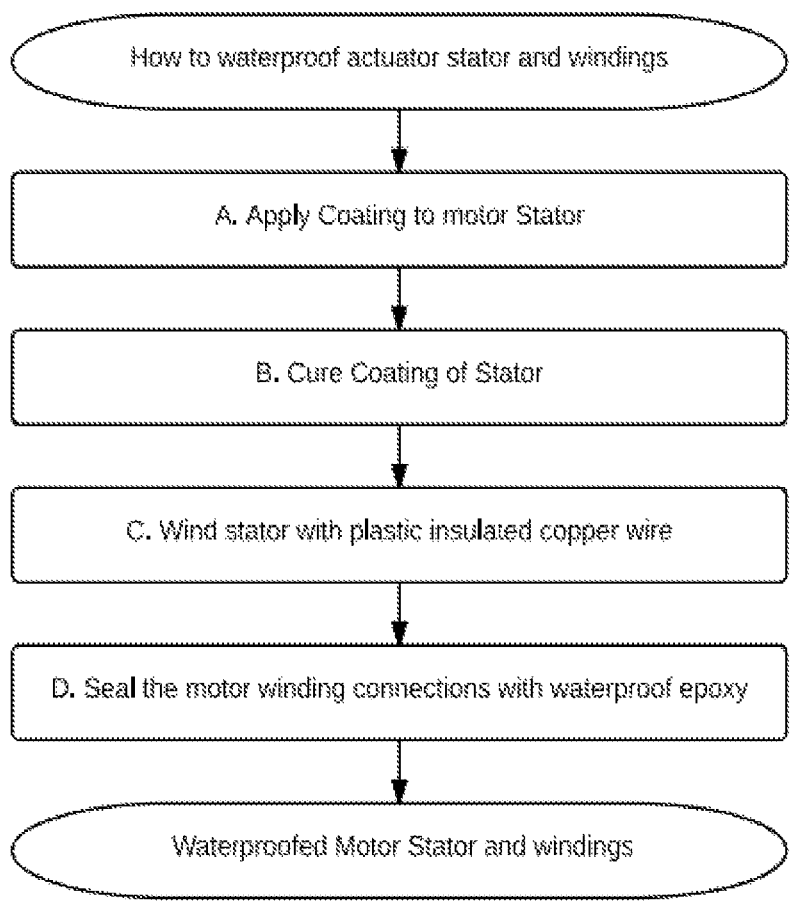
FIG. 36 provides a method of waterproofing an actuator rotor, in accordance with embodiments.

The user will be able to select what component to mount at that previously specified location (I.e. Actuator, mount, sensor, etc.), an actuator 3 is used as an example and is illustrated in FIG. 35. Once the user selects what component to use, a 3d virtual representation of the component will appear on the selected location. In this example, the user must also select two separate rotation angles to fix the actuator 3 to the MUD 1. Once the user has reached this step, two nobs with 8 discrete location will automatically appear that allow the user to select discrete pitch and yaw angles. In another case, the user can first select the component that they want to place and angle on the structure before selecting the mounting location and angle.

Figure 17:
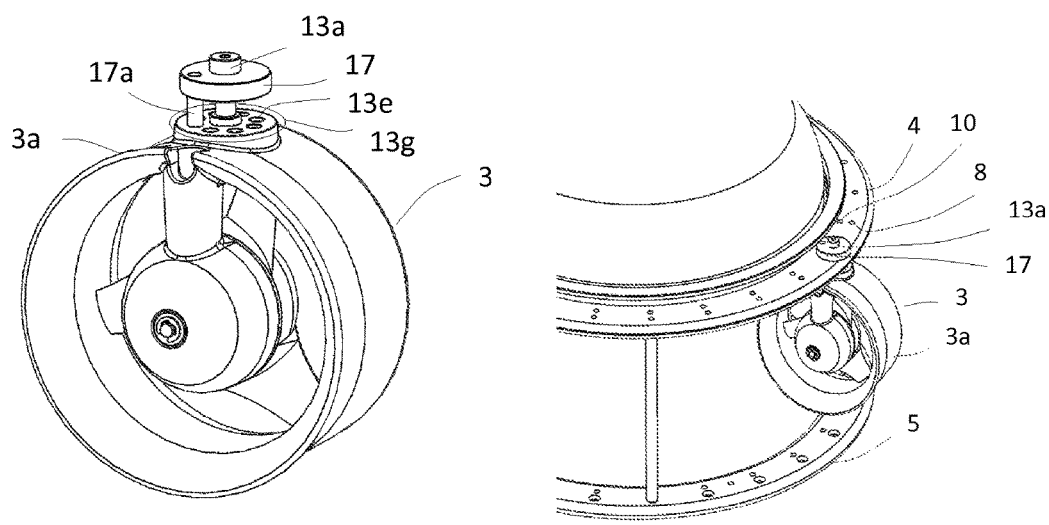
FIG. 17 provides a perspective view of actuator with mount for top and bottom plate (Left), MUD with actuator installed on top plate using angle constraining mechanism (Right), in accordance with embodiments.

A virtual 3D configurator 30 can also be used for the joint assembly 27, the angled mount 18, the mounting technique illustrated in FIG. 17, and all other discrete mount types. If the user wants to delete an actuator 3 from the MUD 1 on the virtual 3D configurator 30, the user will simply select the actuator 3 to delete and select a deletion button on the interface. The user can also modify the location or orientation of a fully mounted actuator 3 by selecting the actuator's mount and assigning a new mounting ID number.

The user will be able to get Real-time feedback of the vehicle performance, cost, etc. while he/she is configuring the vehicle in the 3D environment using the Design Evaluation Tools 24c. (NOTE: Created section that describes the Design Evaluation Tools) The Design Evaluation Tools 24c will also alert user of constraint violations. For example, a selected actuator's mounting point will conflict with the vehicle frame or the actuator's flow will be obstructed by another component. If the Desired Performance 24d is found, the user will Select the Design 24e and then optionally the Manual Vehicle Configurator 24 can allow a person to Purchase 24g the vehicle. Once the user Selects the Design 24e, he/she will Upload the vehicle Model 24f to the physical vehicle processor. In one instance, the Upload Vehicle Model 23g will have a single-click function on the graphical interface that maps the selected configuration to the central processor on the vehicle.

Selection of Configuration from a Predetermined List

In some instances, a user may be able to select a vehicle configuration from a predetermined list. For example, the list may comprise a list of configurations including exploration, construction, object removal, deep diving, strong current resistance, manipulation, end-effector force-moment generation, affixing to the ground, payload manipulation, sampling, autonomous navigation A user may input his or her selection on a user input device, such as a computer, PDA, mobile device (e.g., cell phone), vehicle controller, the vehicle, and the like. After receiving a user input, one or more processors may determine and output an optimal configuration. For example, the output may be on a display screen. For example, the output may be a three-dimensional graphical representation of the vehicle configuration with the appropriate main body and appropriate placement and type of modules on the body. For example, the output may be a graphical mesh representation showing vehicle performance, may be a simulation environment for each configuration, may be a list of instruction on how to configure the configuration, may be predetermined model (controller) for the vehicle, or may be a list of tunable actuator or performance parameters.

Design Evaluation Tools

In order for the user to make advised decisions when designing the MUD 1, several tools are integrated into the graphical user interface.

Figure 33:
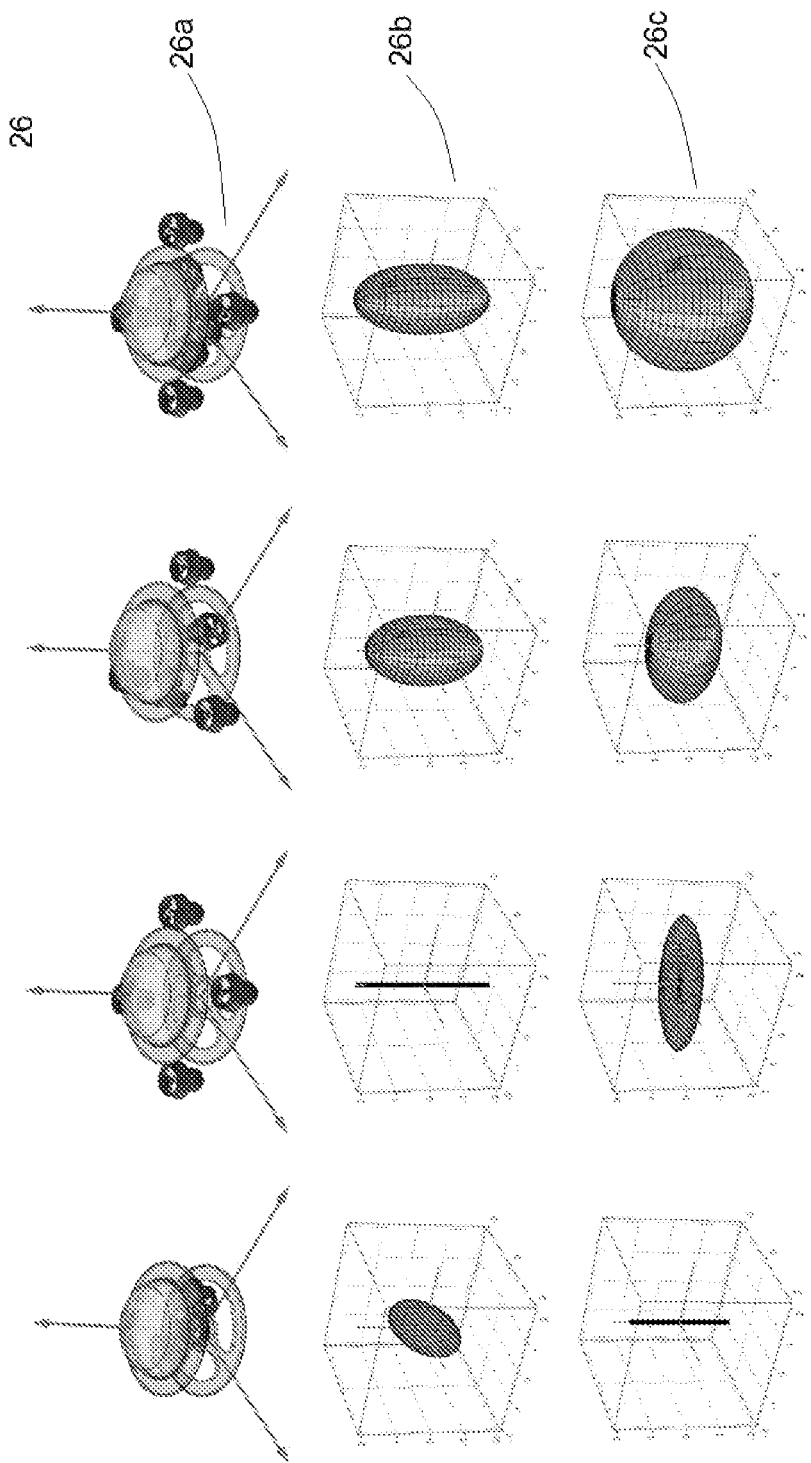
FIG. 33 provides Graphical force and moment feasibility space ellipsoids, in accordance with embodiments.
Figure 34:
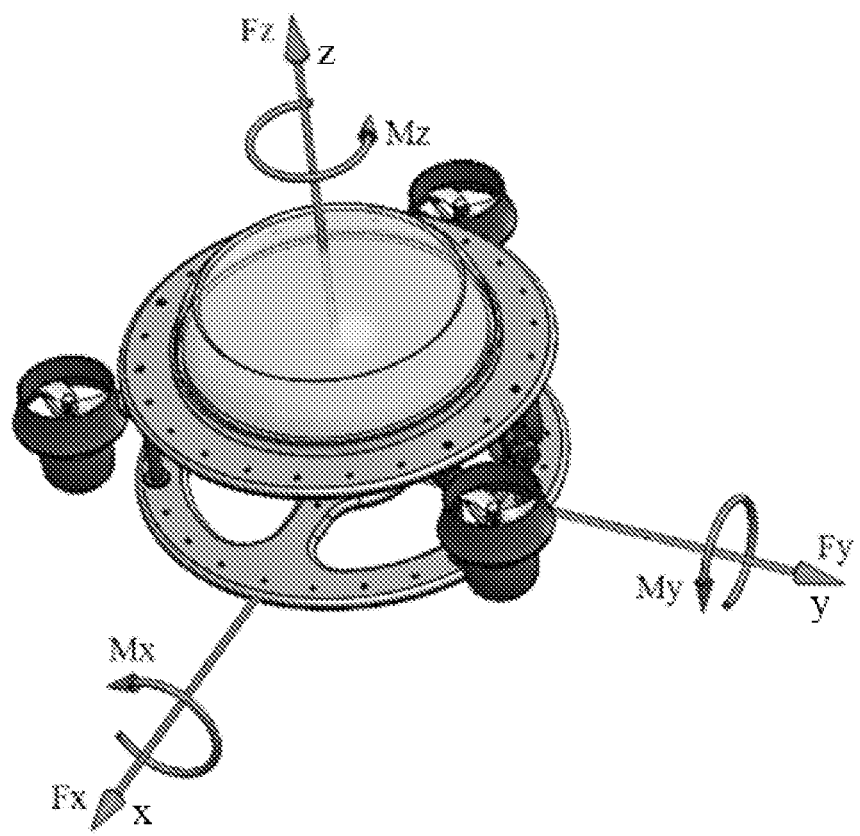
FIG. 34 provides a perspective view of MUD showing coordinate system and location of force vectors and moments, in accordance with embodiments.

The first tool is a graphical representation of vehicle's force and moment capabilities referred to as feasibility space Ellipsoids 26 illustrated in FIG. 34. The feasibility space ellipsoids 26 provide the user with a visual display of the vehicle's instantaneous force and moment capabilities which are proportional to the acceleration of the MUD 1. The first row 26a illustrated in FIG. 33 displays four configurations of the MUD 1. The second row 26b illustrates feasibility ellipsoid for the resultant force of the corresponding MUD 1 from the first row 26a. The third row 26c illustrated feasibility ellipsoids of resultant moments of the corresponding MUD 1 from the first row 26a. The force space ellipsoids 26 can be used to both show the obsolete maximum forces and torques that the MUD 1 can generate and/or the recommended feasible range. The recommended feasible range are the velocities were the MUD 1 will remain stable.

The second tool, the payload simulator, can be used to expedite the design of an MUD 1 by allowing the user to predict the behavior of the MUD 1 when carrying one or a plurality payloads. The user will be able to mount several geometrically shaped payloads (sphere, cylinder, rectangle, and custom shape (triangular mesh or point cloud)) on or around the MUD 1. Besides the shape, the user will define the payload's: scale, mass, COM, surface finish, position, orientation, etc. The payload simulator will automatically simulate how the payload affects the MUD's 1 force space ellipsoids 26, COM, buoyancy, and center of drag (COD) of the vehicle, etc. The payload simulator will also predict the maximum stable velocities for the MUD 1. Given that drag is non-linear (dependent on the vehicle's velocity), predicting the behavior of the MUD 1 at different velocities is very difficult.

The third tool, the mass calculator, will allow the user to know the mass and the location of the COM of the MUD 1. Knowing the location of the COM is very important because it allows the user to see if the COM is aligned with the gravity vector. The MUD 1 will tilt to one side if the COM is not aligned with the gravity vector and if the MUD 1is underactuated (has less actuators than available degrees of freedom), the MUD 1 will not be able to actively compensate which could affect the movements of the MUD 1. For example, instead of moving forward, the MUD 1 could move forward and dive. Under the mass calculator tool, the user will be able to configure the modular weight mechanism 7 in the user interface and observe real time the effect on the mass and COM of the MUD 1.

The fourth tool, buoyancy calculator, will allow the user to predict the MUD 1's buoyancy. Knowing the vehicle's buoyancy is important, because it determines whether the vehicle will sink, float, or be neutrally buoyant in the water. The buoyancy force also affects the performance of the MUD 1. A large amount of buoyancy will require actuators 3 to be constantly ON in order to force the vehicle under the water; opposite for negative buoyancy.

The fifth tool, the center of drag (COD) simulator, will allow the user to predict the location of the center of drag of the MUD 1. If actuators 3 are located far from the COD on the MUD 1, the vehicle is likely to experience a moment causing the vehicle to rotate instead of just translating when moving forward. To avoid this rotation, the actuators 3 can be repositioned in the virtual environment and the COD simulator can be used to model the effects of drag before the proceeding to configuring the real MUD 1. In an underactuated vehicle, typically, this adjustment is achieved by moving the thrusters mounted horizontally along the z-axis (shown in FIG. 34) to match the vehicle's center of drag. This can be achieved by moving the thrusters on the plurality of bores 6b on the modular column joint 6. Another method is to move the COM of the vehicle further down along the z-axis (shown in FIG. 34) and away from the center COB. By separating the COM and COB, one is creating a moment that increases the passive stability of the vehicle. The moment created between COM and COB, must be larger than the moment created by horizontal thrusters and center COD in order to insure the vehicle will not rotate.

The sixth tool, battery life estimator, will allow the user to predict the duration of the MUD 1 in the water, if the power system 2j used is a battery, under different actuator 3 configurations, mission requirements, and environment conditions (wind, water currents, depth, etc.)

The seventh tool, the end-effector force calculator, will allow the user to predict forces and moments that the MUD 1 can apply at one or a plurality of spherical joints in space (a spherical joint is defined by three unit vectors, Vx, Vy, Vz, and three moments Mx, My, Mz). The location of this spherical joint will be described by a coordinate system (Ex, Ey, Ez) that is described with respect to the coordinate system (x, y, z) of the MUD 1 shown in FIG. 34. The system will automatically perform the transformation calculation between the vehicle coordinate system and the location of the end-effector.

Online Cost Calculation and BOM Tool (8th and 9th tool)

The 8th tool, real time cost estimate. Given that the MUD 1 can result in many configurations and can use several types of mounts to achieve those configurations, the cost to make each MUD 1 will vary.

The 9th tool, Bill of Materials, will outline all the parts needed for the chosen configuration. This table will serve as a checklist for the manufacturer to insure that all the parts are packaged and delivered to the customer. And will also serve as a reference for the customer, so he/she know what extra parts he/she need to go from one vehicle configuration to another.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A submersible underwater vehicle, wherein the vehicle comprises:
   a water tight compartment, wherein the water tight compartment comprises:
   1) a cover having a circular shape defining a volume of the water tight compartment, wherein the circular shape is symmetric, and
   2) a base coupled to the cover; a circular upper frame coupled to the water tight compartment;
   a circular lower frame coupled to the circular upper frame via one or more joints, wherein the circular upper frame, the circular lower frame, and the one or more joints define a hollow portion of the vehicle configured to allow fluid flow there through;
   a plurality of actuators coupled to the circular upper frame, the circular lower frame, or the one or more joints, wherein the plurality of actuators are at least in part located radially within at least one of: the circular upper frame or the circular lower frame; and
   electronics housed within the water tight compartment, wherein the electronics are configured to effect movement of the plurality of actuators.

2. The submersible underwater vehicle of claim 1, wherein the circular upper frame is fixed relative to the circular lower frame.

3. The submersible underwater vehicle of claim 1, wherein the circular upper and lower frames protrude radially further than the one or more joints, thereby protecting the one or more joints.

4. The submersible underwater vehicle of claim 1, wherein each of the plurality of actuators comprises a motor and a propeller.

5. The submersible underwater vehicle of claim 4, wherein each of the plurality of actuators further comprises a shroud that protects the motor and propeller.

6. The submersible underwater vehicle of claim 5, wherein the propeller is coupled to the shroud via a single cantilevered support, thereby decreasing likelihood for jamming.

7. The submersible underwater vehicle of claim 1, wherein the cover comprises an air pocket, thereby acting as a primary source of buoyancy.

8. The submersible underwater vehicle of claim 1, wherein the cover is symmetrical about a z-axis, thereby producing symmetrical drag characteristics, wherein the z-axis is perpendicular to an x-y plane and the x-y plane is a plane parallel to the circular shape of the cover.

9. The submersible underwater vehicle of claim 1, wherein the cover is symmetric about an x-y plane, thereby producing symmetrical drag characteristics, wherein the x-y plane is a plane parallel to the circular shape of the cover.

10. The submersible underwater vehicle of claim 1, wherein the base comprises a power source.

11. The submersible underwater vehicle of claim 1, wherein the cover is coupled to the base via a press on mechanism.

12. The submersible underwater vehicle of claim 1, further comprising one or more modular weight mechanisms.

13. The submersible underwater vehicle of claim 12, wherein the modular weight mechanism is coupled to the circular lower frame via a plurality of fasteners.

14. The submersible underwater vehicle of claim 12, wherein the modular weight mechanisms allows discrete amounts of weight to be added or removed, thereby I) allowing shifting a center of mass of the submersible underwater vehicle, or b) allowing tuning a buoyancy of the submersible underwater vehicle.

15. The submersible underwater vehicle of claim 1, wherein the circular upper frame or the circular lower frame comprises one or more mounts, wherein the one or more mounts are capable of being locked to mounting positions at a plurality of discrete angles via a hinge mechanism.

16. The submersible underwater vehicle of claim 1, further comprising a payload coupled to the upper frame, the lower frame, or the one or more joints.

17. The submersible underwater vehicle of claim 16, wherein the payload is a camera.

18. The submersible underwater vehicle of claim 1, wherein the plurality of actuators is configured to rotate about a pitch, yaw, or roll axis.

* * * * *